(12) United States Patent
Tanaka et al.

(10) Patent No.: US 8,605,780 B2
(45) Date of Patent: Dec. 10, 2013

(54) CODING DEVICE AND EDITING DEVICE

(75) Inventors: Toshihiro Tanaka, Hyogo (JP); Hiroshi Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 1113 days.

(21) Appl. No.: 12/302,940

(22) PCT Filed: May 31, 2007

(86) PCT No.: PCT/JP2007/061502
§ 371 (c)(1),
(2), (4) Date: Dec. 1, 2008

(87) PCT Pub. No.: WO2007/142281
PCT Pub. Date: Dec. 13, 2007

(65) Prior Publication Data
US 2009/0219989 A1    Sep. 3, 2009

(30) Foreign Application Priority Data

Jun. 2, 2006 (JP) .................................. 2006-154264

(51) Int. Cl.
*H04N 7/12* (2006.01)
(52) U.S. Cl.
USPC ................................................... 375/240.01
(58) Field of Classification Search
USPC ................................................... 375/240.01
IPC ..................................................... H04N 7/12
See application file for complete search history.

(56) References Cited

U.S. PATENT DOCUMENTS

| 6,263,150 | B1 | 7/2001 | Okada et al. |
| 6,466,732 | B1 | 10/2002 | Kimura et al. |
| 6,529,550 | B2 | 3/2003 | Tahara et al. |
| 6,603,413 | B2 * | 8/2003 | Igarashi et al. ................. 341/67 |
| 7,295,615 | B1 | 11/2007 | Kamijo et al. |
| 2002/0080875 | A1 | 6/2002 | Tahara et al. |

(Continued)

FOREIGN PATENT DOCUMENTS

| EP | 0944249 | 9/1999 |
| EP | 0944249 A | 9/1999 |
| EP | 0987895 A | 3/2000 |
| EP | 1139660 | 10/2001 |

OTHER PUBLICATIONS

Bai-Jue Shiehet Al, "A New Approach of Group-Based VLC Codec System with Full Table Programmability", IEEE Transactions on Circuits and Systems for Video Technology, ISSN 1051-8215, Feb. 1, 2001.
E.P.O. Office action, mail date is Sep. 30, 2011.

(Continued)

*Primary Examiner* — David Czekaj
*Assistant Examiner* — Tracy Li
(74) *Attorney, Agent, or Firm* — Greenblum & Bernstein, P.L.C.

(57) ABSTRACT

A coding device includes a coding unit (740) for encoding an input digital signal using code words contained in one of a plurality of variable length code word groups, and a multiplexer (701) for generating a stream by generating a parameter (such as idr_pic_id) describing specific information about the stream, encoding the parameters, and adding it to the output data from the coding unit. The length of the code words contained in any single variable length code word group is the same. The multiplexer selects one variable length code word group containing three or more code words out of the plural groups, and codes the parameter using one code word selected from the code words contained in the selected group.

10 Claims, 25 Drawing Sheets

(56) References Cited

U.S. PATENT DOCUMENTS

| | | | |
|---|---|---|---|
| 2005/0058207 A1 | 3/2005 | Magee et al. | |
| 2005/0152448 A1* | 7/2005 | Crinon et al. | 375/240.01 |
| 2006/0013318 A1* | 1/2006 | Webb et al. | 375/240.25 |
| 2008/0056671 A1 | 3/2008 | Kamijo et al. | |
| 2008/0112490 A1 | 5/2008 | Kamijo et al. | |
| 2008/0117986 A1 | 5/2008 | Kamijo et al. | |
| 2008/0117987 A1 | 5/2008 | Kamijo et al. | |
| 2008/0118101 A1 | 5/2008 | Kamijo et al. | |
| 2009/0323815 A1* | 12/2009 | Kadono et al. | 375/240.16 |

OTHER PUBLICATIONS

"Advanced video coding for generic audiovisual services; H. 264 (May 2003)", ITU-T Standard Superseded (S), International Telecommunication Union, Geneva, CH, No. H264 5/3, May 30, 2003, XP017401452.

"Advanced Video Coding for Generic Audiovisual Services; H.264 (May 2003)," ITU-T Standard Superseded (S), International Telecommunication Union, Geneva, CH, No. H264 5/3, May 30, 2003, XP017401452.

Banerji et al., "Stitching of H.264 Video Streams for Continuous Presence Multipoint Videoconferencing," Journal of Visual Communication and Image Presentation, Academic Press, Inc., US, vol. 17, No. 2, Apr. 2006, pp. 490-508, XP005312635.

Chinese Office Action in Chinese Application No. 200780020436 dated Nov. 8, 2011.

Extended European Search Report from European Patent Office (EPO) in European Patent Application No. 12154537.0, dated Jan. 28, 2013.

\* cited by examiner

*Fig.6*

| pic_parameter_set_id (PPSID) | 0 | 1 | 2 | 3 | ... |
|---|---|---|---|---|---|
| seq_parameter_set_id | 0 | 0 | 0 | 0 | |
| entropy_coding_mode_flag | 1 | 1 | 1 | 1 | |
| ... | | | | | |
| pic_init_qp_minus26 | 0 | 10 | 0 | 10 | |
| ... | | | | | |
| chroma_qp_index_offset | 0 | 0 | 3 | 3 | |
| ... | | | | | |

| seq_parameter_set_rbsp( ) { | Descriptor |
|---|---|
| profile_idc | u(8) |
| constraint_set0_flag | u(1) |
| ... | |
| seq_parameter_set_id | ue(v) |
| ... | |
| } | |

Fig. 22

| pic_parameter_set_rbsp( ) { | Descriptor |
|---|---|
| pic_parameter_set_id | ue(v) |
| seq_parameter_set_id | ue(v) |
| entropy_coding_mode_flag | u(1) |
| ... | |
| } | |

Fig. 23

| slice_header( ) { | Descriptor |
|---|---|
| first_mb_in_slice | ue(v) |
| slice_type | ue(v) |
| pic_parameter_set_id | ue(v) |
| ... | |
| if( nal_unit_type == 5 ) | |
| idr_pic_id | ue(v) |
| ... | |
| slice_qp_delta | se(v) |
| ... | |
| } | |

*Fig. 24*

| Bit string form | Range of codeNum |
|---|---|
| 1 | 0 |
| 0 1 $x_0$ | 1-2 |
| 0 0 1 $x_1$ $x_0$ | 3-6 |
| 0 0 0 1 $x_2$ $x_1$ $x_0$ | 7-14 |
| 0 0 0 0 1 $x_3$ $x_2$ $x_1$ $x_0$ | 15-30 |
| ... | ... |

*Fig. 25*

| codeNum | syntax element value |
|---|---|
| 0 | 0 |
| 1 | 1 |
| 2 | -1 |
| 3 | 2 |
| 4 | -2 |
| ... | ... |

*Fig. 26*

| nal_unit( NumBytesInNALunit ) { | Descriptor |
|---|---|
| ... | |
| nal_unit_type | u(5) |
| NumBytesInRBSP = 0 | |
| for( i = 1; i < NumBytesInNALunit; i++ ) { | |
|   if(...) { | |
|     ... | |
|   } else | |
|     rbsp_byte[ NumBytesInRBSP++ ] | b(8) |
| } | |
| } | |

Fig. 27

| slice_layer_without_partitioning_rbsp( ) { | Descriptor |
|---|---|
| slice_header( ) | |
| slice_data( ) | |
| ... | |
| } | |

Fig. 28

| slice_data( ) { | Descriptor |
|---|---|
| if( entropy_coding_mode_flag ) | |
| while( !byte_aligned( ) ) | |
| cabac_alignment_one_bit | f(1) |
| ... | |
| do { | |
| ... | |
| macroblock_layer( ) | |
| ... | |
| } while( moreDataFlag ) | |
| } | |

Fig. 29

| byte_stream_nal_unit( NumBytesInNALunit ) { | Descriptor |
|---|---|
| ... | |
| start_code_prefix_one_3bytes | f(24) |
| nal_unit( NumBytesInNALunit ) | |
| while(...) | |
| trailing_zero_8bits | f(8) |
| } | |

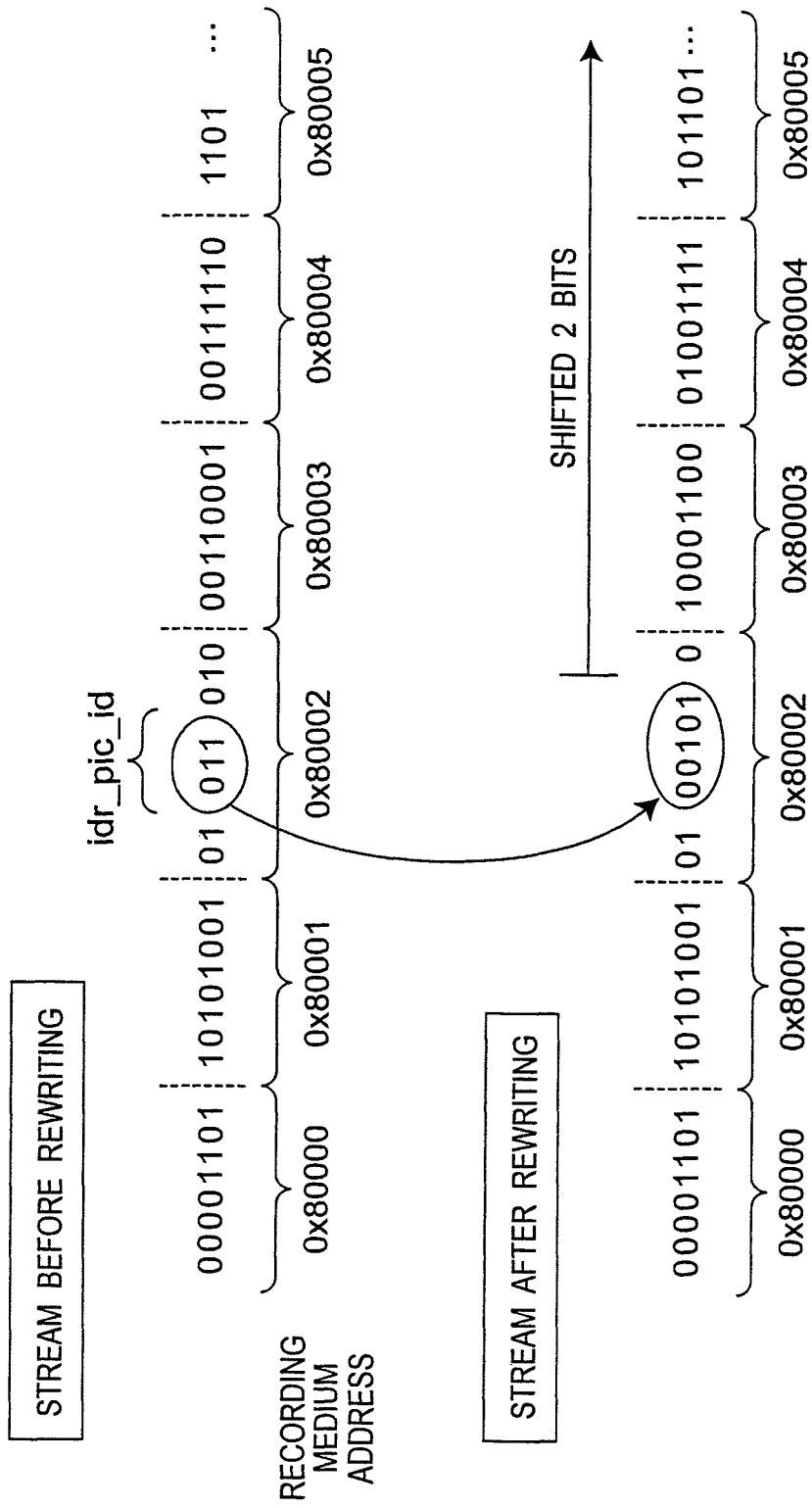

CODING DEVICE AND EDITING DEVICE

TECHNICAL FIELD

The present invention relates to a coding device for encoding using a coding method that embeds information by variable length coding, and to an editing device for editing a stream generated by the coding device.

BACKGROUND ART

Variable length coding (VLC) is a fundamental technology used in encoding source data, and compresses the data by allocating code words of different lengths according to the likelihood of a particular data source symbol. Using coding rules such as shown in FIG. 24, for example, values (code-Num) greater than 0 are converted to variable length code words of 1, 3, 5, ... bits. Note that the bit string part denoted $x_n, x_{n-1}, \ldots x_0$ is the part of the bit string that varies according to the data value (codeNum). For example, a value (code-Num) of 1 or 2 is encoded to a 3 bit code word, and values from 7 to 14 are converted to a 7 bit code word. The length of the code words after encoding thus varies according to the data value (codeNum) being encoded by VLC.

VLC is used in encoding standards for motion picture represented by MPEG. More particularly, Target to which VLC is applied is classified into syntax of video encoded data such as the DCT coefficient and motion vectors of image pixel blocks, and syntax for the header. As the coding tools used in image compression technology have become more versatile and complex, the syntax types used in the header have also increased, and VLC is increasingly used in the header syntax in order to reduce the code size.

The H.264/AVC standard (ISO/IEC 14496-10) (see ISO/IEC 14496-10, Advanced video coding for generic audio/visual services) also uses VLC for various syntax included in the sequence parameter set (SPS), the picture parameter set (PPS) and the Slice header.

FIG. 21 to FIG. 23 outline the syntax of the SPS, PPS, and slice header. "Descriptor" of ue(v) or se(v) in these figures denotes a VLC syntax, where ue(v) indicates coding values (codeNum) greater than 0 to VLC words of 1, 3, 5, ... bits as shown in FIG. 24, and se(v) indicates coding in VLC as shown in FIG. 24 after first converting signed values to a codeNum as shown in FIG. 25.

Configuration of the H.264 byte stream is described next with reference to FIG. 26 to FIG. 29. The image coding data is stored in the slice data (slice_data) shown in FIG. 28. A slice is one division of the picture divided into n parts (n≥1), and is a set of macroblocks. The slice data is coded with the slice header in a slice layer (slice_layer_without_partitioning_rbsp) shown in FIG. 27. The SPS, PPS, and slice layer are packetized as a NAL unit (nal_unit) shown in FIG. 26. When NAL units containing the SPS, PPS, and slice layer are multiplexed into a single stream, the NAL units are packetized into byte stream NAL units (byte_stream_nal_unit, "BNU" below) connected in a single byte stream.

The process to connect plural H.264 byte streams by the video editing device is described next with reference to FIG. 30. More specifically, FIG. 30 shows the process of connecting substream a (153) in stream A (150) and substream b (163) in stream B (160) to generate byte stream C (170).

Stream A (150) includes the byte stream NAL unit (SPS-BNU) 151 of the SPS 110, the byte stream NAL unit (PPS-BNU) 152 of the PPS 111, and the substream a (153) of the scene to be connected to substream b (163). Likewise, stream B (160) includes the SPS-BNU 161, the PPS-BNU 162, and the substream b (163) of the scene to be connected to substream a (153). Each substream a (153) and substream b (163) contains one or more sets including a byte/NAL header (for example, 101), slice header (for example, 120), and slice data (for example, 121).

In this example it is assumed that stream A (150) and stream B (160) contain IDR (Instantaneous Decoding Refresh) pictures, and the code size of all IDR pictures is the same in stream A (150) and stream B (160). The SPS and PPS are also assumed to be at the beginning of the byte stream.

The H.264 standard uses the idr_pic_id as the IDR picture identifier (ID). As shown in FIG. 23, the idr_pic_id is found in the slice header and contains a VLC value. To assure stream compatibility, the H.264 standard requires that the idr_pic_id of adjacent IDR pictures are set to different values.

The process of connecting substream a (153) and substream b (163) based on the foregoing assumptions generates a new byte stream C (170) by connecting substream a (153) and substream b (163) while rewriting the idr_pic_id contained in all of the slice headers in the pictures where the streams are connected to different values in adjacent pictures in order to assure readability and compatibility. More specifically, each of the adjacent pictures in stream A (150) and stream B (160) before the streams are connected is assigned a different idr_pic_id, and it is also necessary to ensure that the pictures that are adjacent where the streams are connected are also assigned a different idr_pic_id after the streams are connected.

DISCLOSURE OF THE INVENTION

In order to assure the idr_pic_id is different in each picture made newly adjacent where two streams are connected (also referred to below as the "seam"), the value of the idr_pic_id must be overwritten in the pictures that are adjacent at the seam immediately after the streams are connected.

The value of the idr_pic_id is obtained by VLC. When the value of the idr_pic_id in one IDR picture is overwritten so that the idr_pic_id differs from the idr_pic_id in the adjacent IDR picture, the length of the idr_pic_id code word may be different before and after the values are changed. This may make it necessary to modify the data following the idr_pic_id, and the process becomes increasingly complicated.

As shown in FIG. 31, for example, in order to assign a different idr_pic_id to the adjacent IDR pictures where streams recorded to a recording medium are connected, it may be necessary to change the code word 011 of the idr_pic_id at address 0x80002 to the code word 00101. Because the code word 00101 after changing the idr_pic_id is two bits longer than the code word 011 of the original idr_pic_id, all data from address 0x80002 and beyond must also be shifted two bits in the rewriting process.

This bit shifting process must also be applied to all recording media that manages data of several bit length with linear address, including primary recording media such as semiconductor memory and secondary recording media such as hard disk drives.

As described above, when connecting plural byte streams that are encoded according to the H.264 standard, the idr_pic_id contained in the slice header on the recording medium must be rewritten in order to assure compatibility and the ability to reproduce the streams. However, when the idr_pic_id must be rewritten to a code word of a different length, the bit shifting process described above must be run and the data area must be rewritten. A problem with rewriting the data area is that processing can take a long time when CPU power is limited or the access speed of the recording medium is slow.

Another problem is that when it is desirable to limit rewriting the recording medium, such as with optical disc media, rewriting the medium more than necessary can shorten the usable service life of the recording medium. These same problems can also be caused by rewriting the pic_parameter_set that is also contained in the slice header.

Solving Means

The present invention is directed to solve the above problems, and has an purpose to provide a coding device capable of eliminating unnecessarily rewriting data when connecting byte streams conforming to the H.264 standard, for example, and an editing device capable of suppressing the CPU processing load and the number of times of rewriting the recording medium, when connecting the byte streams.

A coding device according to the invention is a device for encoding an input digital signal to generate a stream. The coding device includes a coding unit operable to encode an input digital signal using code words contained in one of plural code word groups each including variable length code words, and a multiplexer operable to generate the stream by generating parameters describing specific information about the streams, encoding the parameters, and adding the encoded parameters to the output data from the coding unit. The length of the code words contained in any single code word group is the same. The multiplexer selects one code word group containing three or more code words out of the plural code word groups, and codes the parameter using one code word selected from the code words contained in the selected code word group.

An editing device according to the invention is a device for connecting first and second streams containing variable length coded parameters. The editing device includes a decision unit operable to compare an encoded first parameter contained in the first stream with an encoded second parameter contained in the second stream, and decide whether at least one of the first parameter and the second parameter is to be changed, and a replacing unit operable to replace at least one of the first and second parameters with the other code word of the same length as the code words assigned to the first and second parameters, when the decision unit decides that at least one of the parameters is to be changed.

The coding device of the invention substantially eliminates unnecessary data rewriting operations when connecting streams (such as H.264 standard byte streams) containing variable length coded parameters because even if a parameter is changed the code length of the parameter is not changed.

Further according to the invention, if a header containing a variable length coded parameter must be rewritten when connecting streams, and compatibility can be assured by using code words having the same code length as the original header that is rewritten, the editing device of the invention replaces the code word in the header where the streams are connected with a code word of the same length. On the contrary, if a code word of the same code length is not available, the editing device rewrites the header so that the data length of a specific data unit does not change. The invention thus affords a coding device that does not cause rewriting more data than necessary as a result of rewriting the header, reduces the load on the CPU when editing and connecting streams, and reduces the number of recording medium write operations.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows the table for storing and managing picture parameter sets in a second embodiment of the invention.

FIG. 19 shows the data structure of the FAT file system in the third embodiment of the invention.

FIG. 21 shows the SPS syntax of the H.264 standard.

FIG. 22 shows the PPS syntax of the H.264 standard.

FIG. 23 shows the slice header syntax of the H.264 standard.

FIG. 24 shows the coding rules for variable length coding the ue(v) Descriptor.

FIG. 25 shows the coding rules for variable length coding the se(v) Descriptor.

FIG. 26 shows the syntax of the NAL unit in the H.264 standard.

FIG. 27 shows the syntax of the slice layer in the H.264 standard.

FIG. 28 shows the syntax of the slice data in the H.264 standard.

FIG. 29 shows the syntax of the byte stream NAL unit in the H.264 standard.

FIG. 31 describes stream editing according to the prior art.

BEST MODE FOR CARRYING OUT THE INVENTION

Preferred embodiments of the present invention are described below with reference to the accompanying figures.

Embodiment 1

1. Configuration of Video Coding Device

The present embodiment describes below a video coding device that controls byte stream coding when connecting a plurality of byte streams which are encoded using IDR (Instantaneous Decoding Refresh) pictures so that necessity to rewrite the idr_pic_id which is the IDR picture identifier (ID) with a code word of a different code length does not occur.

Figure 1:
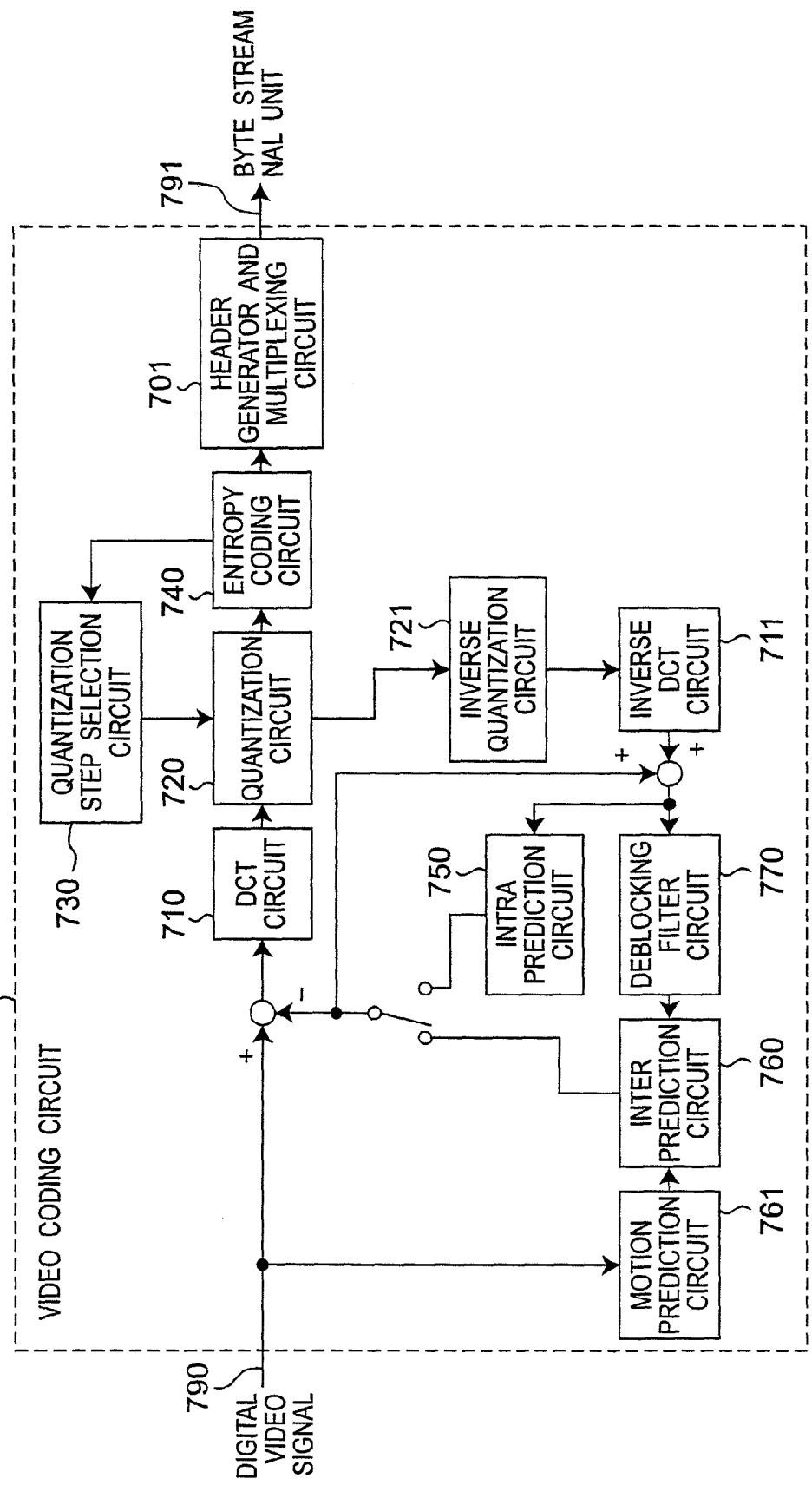
FIG. 1 is a block diagram of a video coding circuit in a first embodiment of the invention.

FIG. 1 shows the video coding circuit included in the video coding device according to this embodiment of the invention. This video coding circuit 700 includes a header generator and multiplexing circuit 701, a DCT circuit 710, an inverse DCT circuit 711, a quantization circuit 720, an inverse quantization circuit 721, a quantization step selection circuit 730, an entropy coding circuit 740, a intra prediction circuit 750, a inter prediction circuit 760, a motion prediction circuit 761, and a deblocking filter circuit 770. The motion prediction circuit 761 and the inter prediction circuit 760 are not needed when encoding only IDR pictures.

2. Operation of Video Coding Circuit

The operation of the video coding circuit 700 is described next.

Coding an intra macroblock that can be decoded using only data contained in the same frame is described first. A macroblock is generally a 16×16 block of pixels, and includes a plurality of blocks that are the unit for DCT and intra prediction coding.

The pixel difference value is calculated for each pixel between macroblock ("target macroblock") that is to be encoded in the input digital video signal 790 and target macroblock predicted by the intra prediction circuit 750, resulting in a 16×16 block of pixel difference values.

The DCT circuit 710 applies a DCT process to the block of difference values. This process is normally applied to 4×4 or 8×8 pixel blocks, and outputs the frequency component conversion coefficient. The conversion coefficient is input to the quantization circuit 720 and quantized. The quantized conversion coefficient is then encoded by the entropy coding circuit 740. Entropy coding in the H.264 standard uses either context-adaptive variable length coding (CAVLC) or context-adaptive binary arithmetic coding (CABAC). The code size after entropy coding is input to the quantization step selection circuit 730.

The quantization step selection circuit 730 controls the value of the quantization step of the quantization circuit 720 so that the resulting code size goes to a target code size. After quantization the coefficient is also decoded by the inverse quantization circuit 721 and the inverse DCT circuit 711 and input to the intra prediction circuit 750. The intra prediction circuit 750 generates predicted pixel values for the neighboring macroblocks that are encoded later.

Coding the inter macroblocks using inter-frame prediction is described next. The motion prediction circuit 761 applies a matching process to the block currently being coded (the block that is the unit used for motion compensation) and the pixels of the reference frame, and calculates the vector resulting in the least error. The error between the predicted pixel values of the target macroblock output by the inter prediction circuit 760 based on the result of the motion prediction and the pixel values of the target macroblock in the input digital video signal 790 is calculated and input to the DCT circuit 710. The process after input to the DCT circuit 710 is basically the same as for intra macroblock coding. In inter coding, however, a deblocking filter circuit 770 is commonly used to reduce visible block distortion.

The header generator and multiplexing circuit 701 generates the slice header, adds the slice header to the slice data encoded by the entropy coding circuit 740, and outputs the result as a byte stream NAL unit 791. The header generator and multiplexing circuit 701 incorporates the idr_pic_id in the slice header at this time.

In the video coding circuit 700 according to this embodiment of the invention, the header generator and multiplexing circuit 701 assigns the code words according to the coding rules shown in FIG. 24 when adding the idr_pic_id to the picture. The coding rules shown in FIG. 24 divide the data values (codeNum) into a number of ranges (groups), and the code word length is the same in each range (group), but the length of the code words in one range (group) differs from the code word length in each other range (group). For example, the code words for all data values in the range 3 to 6 are 5 bits long, but the code words for all data values in the range 7 to 14 are 7 bits.

More specifically, to add the idr_pic_id, the video coding circuit 700 (more particularly, the header generator and multiplexing circuit 701) in this embodiment of the invention selects one range where there are three or more code words in a range of plural codeNum values, selects one of plural code words contained in the selected range, and assigns the selected code word to the idr_pic_id. For example, referring to FIG. 24, one of the codeNum ranges each of which includes code words of 5 or more bits long is selected. That is, one of the codeNum ranges corresponding to "$001x_1x_0$", "$0001x_2x_1x_0$", and "$00001x_3x_2x_1x_0$", ..., is selected. If the range of data values 3 to 6 ($001x_1x_0$) is selected, the value of the idr_pic_id is assigned 3, 4, 5, or 6.

Figure 2:
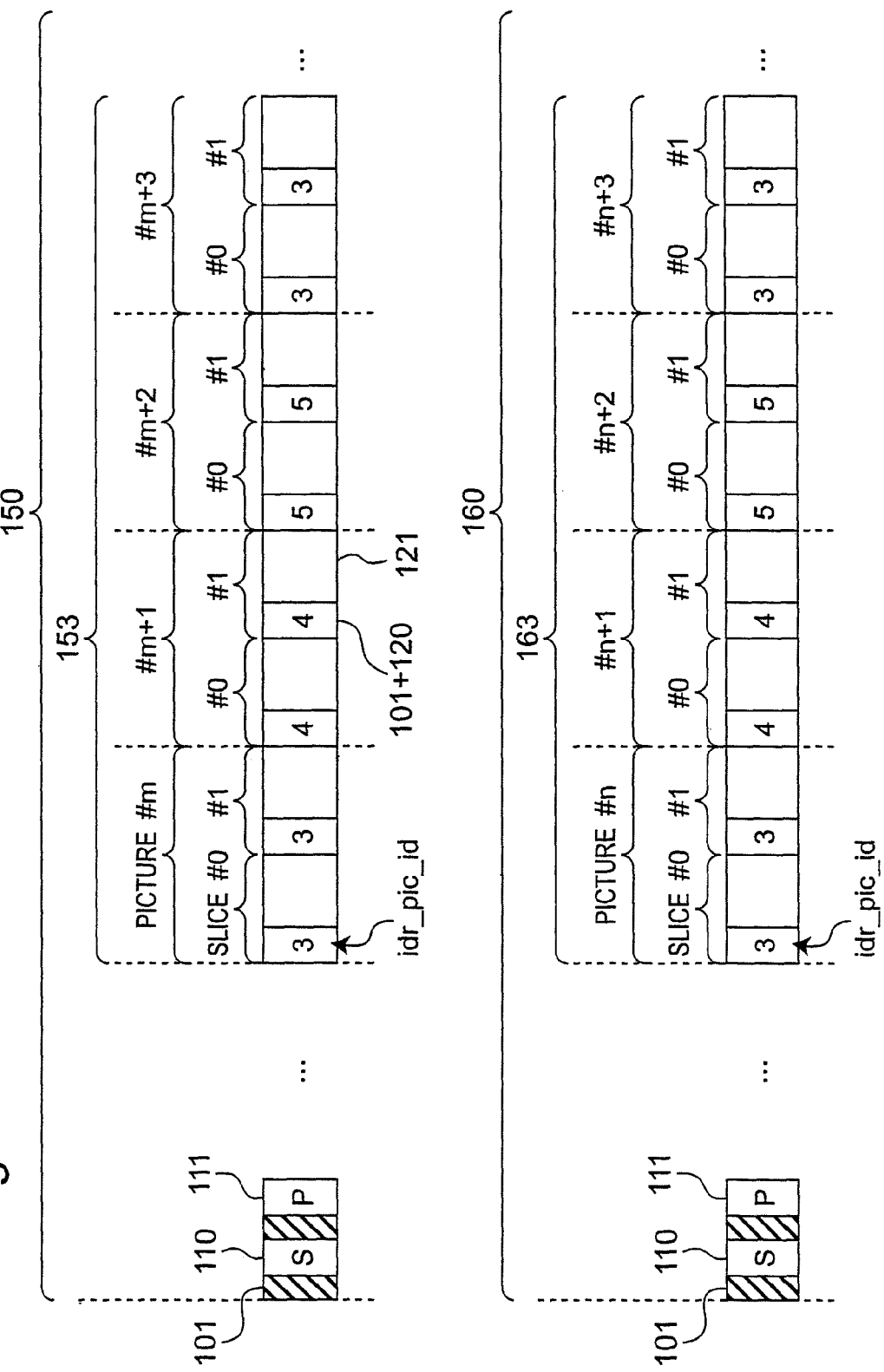
FIG. 2 describes coding the idr_pic_id in the first embodiment of the invention.
Figure 3:
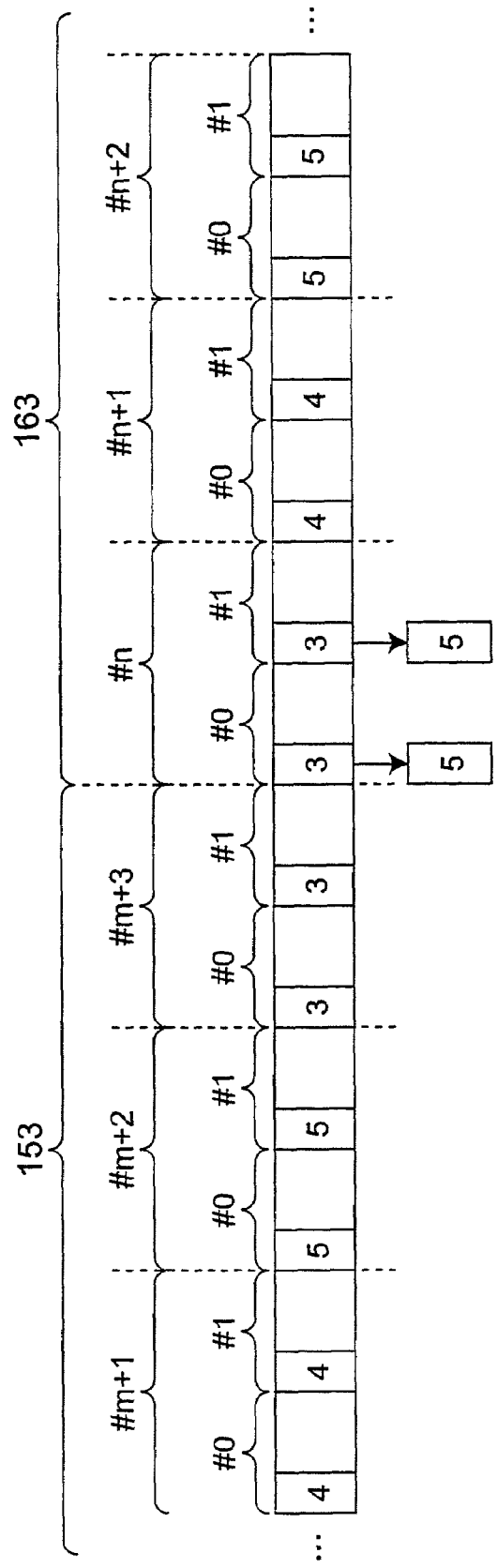
FIG. 3 describes the process of connecting streams in the first embodiment of the invention.

FIG. 2 describes an example of assigning the idr_pic_id when the range of codeNum 3-6 is selected to assign the idr_pic_id. When generating stream A (150) and stream B (160), the video coding circuit 700 determines the value of the idr_pic_id assigned to the slice header of the i-th (where i is an integer greater than 0) IDR picture from the following equation $$idr\_pic\_id = 3 + (i\%3)$$

where % is an operator that returns the remainder.

In the H.264 standard requires that the idr_pic_id is different in adjacent IDR pictures. As shown in FIG. 24, if the codeNum is a value of 3 to 6, the code word of idr_pic_id is 5 bits long. The code word length therefore will not change if the value of the idr_pic_id is rewritten using code words in the same range. Therefore, if substream a (153) and substream b (163) shown in FIG. 2 are connected using this coding method and the pictures #m+3 and #n that are adjacent where the streams are connected would have the same idr_pic_id, the idr_pic_id can be easily changed to a different value. In this example both picture #m+3 and picture #n have the same idr_pic_id (3 in this example), and the idr_pic_id of picture #n+1 is 4. The idr_pic_id of picture #n is therefore changed to 5. By using a value in a codeNum range where there are three or more codes of the same length, the idr_pic_id of picture #n can be rewritten to a value (5 in this example) of the same length that is different from the idr_pic_id of the adjacent pictures #m+3 and #n+1. Note that while both substream a (153) and substream b (163) in FIG. 2 are four pictures long, it will be obvious that the idr_pic_id can be rewritten in the same way regardless of the number of pictures in the substream.

The video coding circuit 700 in this embodiment of the invention does not need to use the same codeNum range that is used to assign the idr_pic_id for all encoded streams. Selecting the same range is only necessary when the parameters such as the horizontal pixel count, vertical pixel count, and bit rate of the pictures are the same, or when the connection is significant. For example, the content could be encoded at two different bit rates, a high bit rate and a low bit rate, where the high bit rate stream is the primary content and the low bit rate stream is used for video previews. Because there is no need to connect the low bit rate streams in this case, an idr_pic_id=i%2 could be used to minimize the code length of the low bit rate content while an idr_pic_id=3+(i % 3) could be used for the high bit rate content.

3. Recording Device

Figure 4:
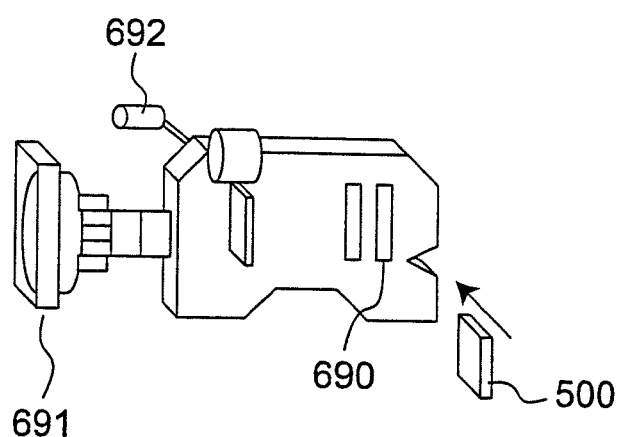
FIG. 4 shows a video recording device in the first embodiment of the invention.

FIG. 4 shows a video recording device that has the video coding circuit 700 described above. This video recording device 600 encodes video and audio information input through the lens 691 and microphone 692 by means of the incorporated video coding circuit 700, and records the encoded streams to the recording medium 500 inserted to a drive 690.

Figure 5:
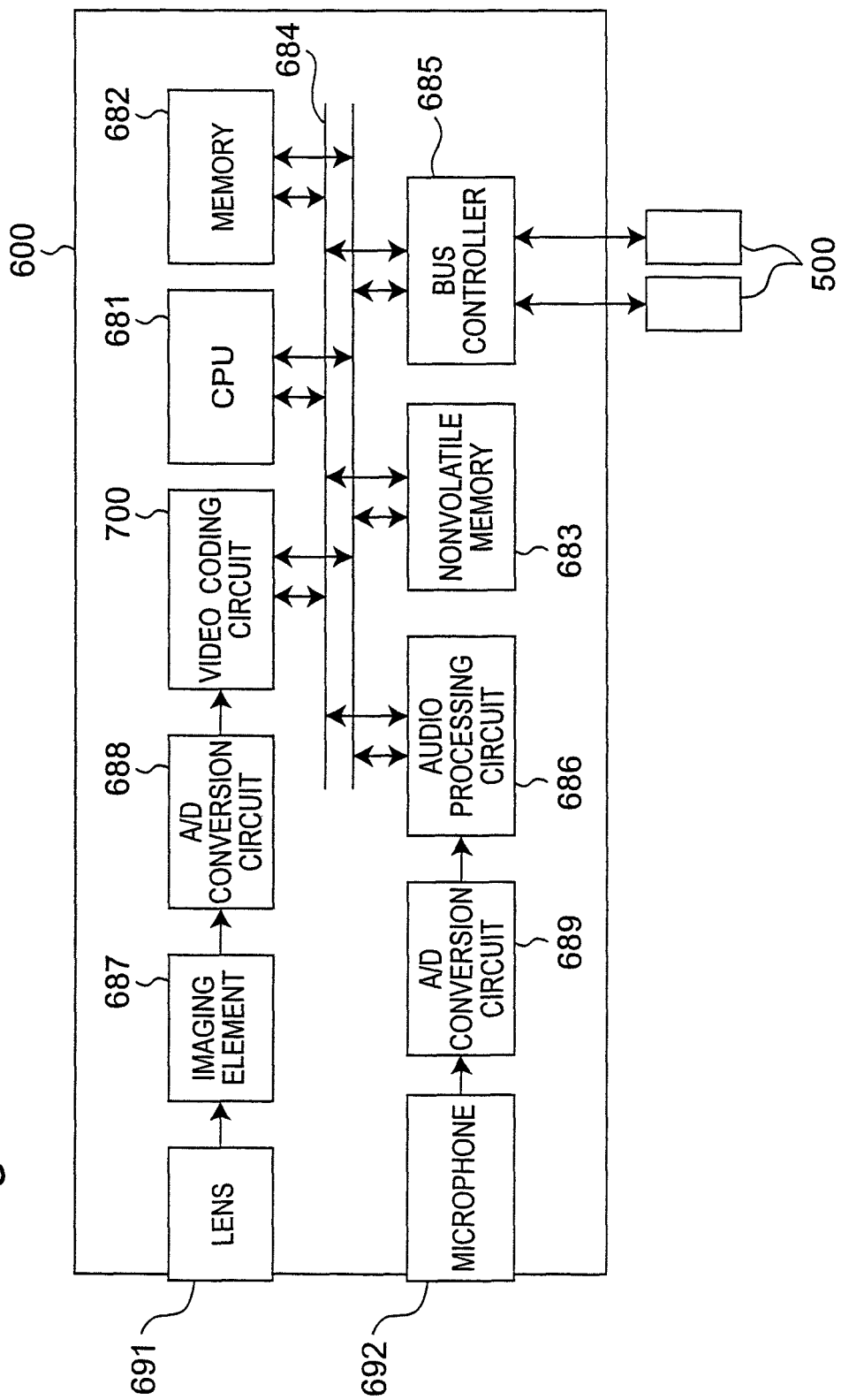
FIG. 5 is a block diagram of the video recording device in the first embodiment of the invention.

FIG. 5 is a block diagram of the video recording device 600. As shown in FIG. 5 the video recording device 600 has a lens 691, a microphone 692, an imaging element 687, A/D conversion circuits 688 and 689, an audio processing circuit 686, a CPU 681, a memory 682, a nonvolatile memory 683, a bus controller 685, and the video coding circuit 700. The CPU 681 controls operation of the video recording device 600. The nonvolatile memory 683 stores the programs run by the CPU 681. The bus controller 685 controls input/output to the recording medium 500.

A light for video information is focused on the imaging element 687 by the lens 691. The imaging element 687 converts the imaged information to an electric signal. The A/D conversion circuit 688 converts the electric signal to a digital video signal. The video coding circuit 700 then encodes the digital video signal to a H.264 standard byte stream, and records the byte stream to the recording medium 500. The byte stream recorded to the recording medium 500 can then be edited by an editing device (described below) after recording is completed.

4. Conclusion

As described above, this embodiment of the invention affords a video coding device that can reduce the processor load during editing when connecting plural byte streams that are coded using IDR pictures.

This embodiment of the invention is described assuming that all of the pictures are IDR pictures, but the invention is not so limited. It will be obvious that the invention can be used when the assumptions described above are not true, such as when the adjacent pictures where the two streams are connected are IDR pictures.

The foregoing embodiment is also described assuming that the code size of all pictures is the same or the buffer constraints of the virtual reference decoder can be maintained, but the following operation can also be used by the video editing device to meet the buffer constraints.

If the buffer occupancy VA after substream a (153) ends is greater than the buffer occupancy VB just before substream b (163) starts before the connection of the stream, (VA-VB) bytes of trailing_zero_8 bits (padding bits) can be inserted immediately after the end of substream a (153) so that buffer occupancy becomes VB.

If VA is less than VB, several pictures at the end of substream a (153) can be re-encoded, for example, so that buffer occupancy becomes VB.

This method makes the concept of the invention available regardless of the above assumptions.

This embodiment of the invention also assumes that the SPS or PPS is located only at the beginning of the byte stream, but the PPS does not need to be at the beginning of the byte stream, and if the SPS of substream b (163) is not the same as the SPS of substream a (153), it does not need to be at the beginning.

The invention is described using coding the idr_pic_id by way of example, but the invention can be used to encode syntax coded in VLC for any parameter including SPS, PPS, and a slice header. This embodiment also assumes that a byte stream is present, but embodiments that multiplex NAL units are not so limited.

Embodiment 2

The present embodiment describes below a video coding device that connects and encodes plural byte streams without necessity to rewrite the pic_parameter_set_id that is identifier of the PPS (picture parameter set). This embodiment is particularly useful when connecting a plurality of byte streams in which plural PPS are coded. The basic configuration of the video coding device is the same as in the first embodiment of the invention described above.

In this embodiment of the invention the header generator and multiplexing circuit 701 stores and manages the combinations of PPS content and pic_parameter_set_id ("PPSID") values. More specifically, if the syntax is different for all encoded PPS in the streams generated by the video coding device according to this embodiment of the invention, the coding process assigns a different PPSID to each PPS.

FIG. 6 is a table for storing and managing the PPS in the header generator and multiplexing circuit 701. When the PPS syntax value is different, a different PPSID is assigned. If a PPS having pic_init_qp_minus26=10 and the same syntax as PPS with PPSID=0 except pic_init_qp_minus26 is created, a new PPS with PPSID=1 is added. Similarly, if a PPS having chroma_qp_index_offset=3 and the same syntax as PPS with PPSID=0 except chroma_qp_index_offset is created, a new PPS of PPSID=2 is added. If a PPS having pic_init_qp_minus26=10 and chroma_qp_index_offset=3 and the same syntax as PPS with PPSID=0 except pic_init_qp_minus26 and chroma_qp_index_offset is created, the created PPS differs from the PPS of PPSID=0, 1, and 2, and thus a PPS of PPSID=3 is added. The PPS management table is thus updated so that a unique PPSID is assigned to the PPS. The header generator and multiplexing circuit 701 of the video coding device can assign unique, non-duplicating PPSID values with reference to a PPS management table such as shown in FIG. 6.

Figure 7:
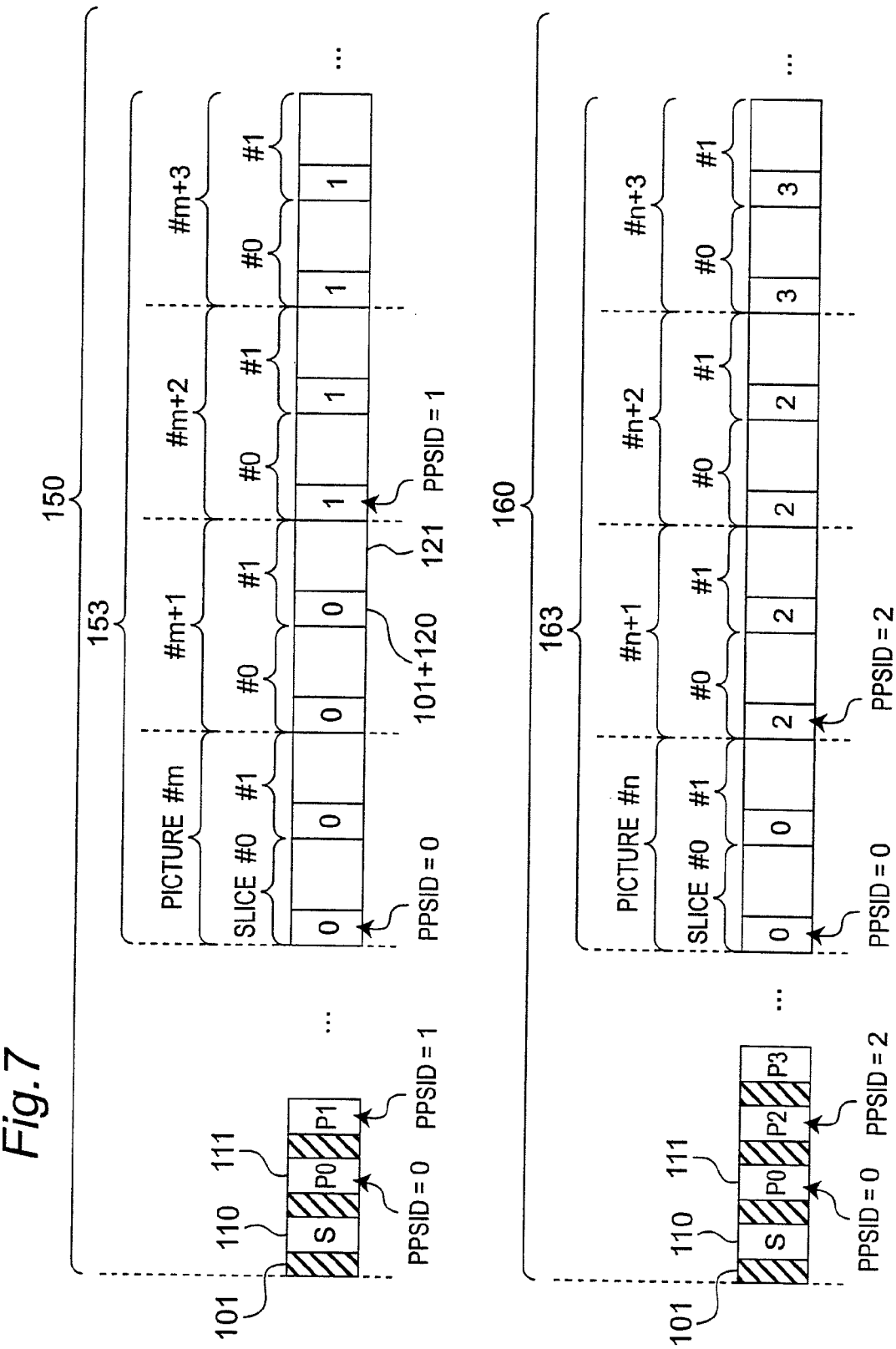
FIG. 7 describes coding the pic_parameter_set_id in the second embodiment of the invention.

With reference to FIG. 7, the process of the header generator and multiplexing circuit 701 assigning the PPSID is described next. If two different PPS of PPSID=0 and 1 are required for coding in stream A (150), the two PPS are output and the PPSID value to be referred to in the slice header is output. Similarly, for coding stream B (160), if three different PPS of PPSID=0, 2, and 3 are needed, the three PPS are output and the PPSID value to be referred to in the slice header is output. What is essential is that the PPSID values are defined uniquely throughout both stream A (150) and stream B (160).

Figure 8:
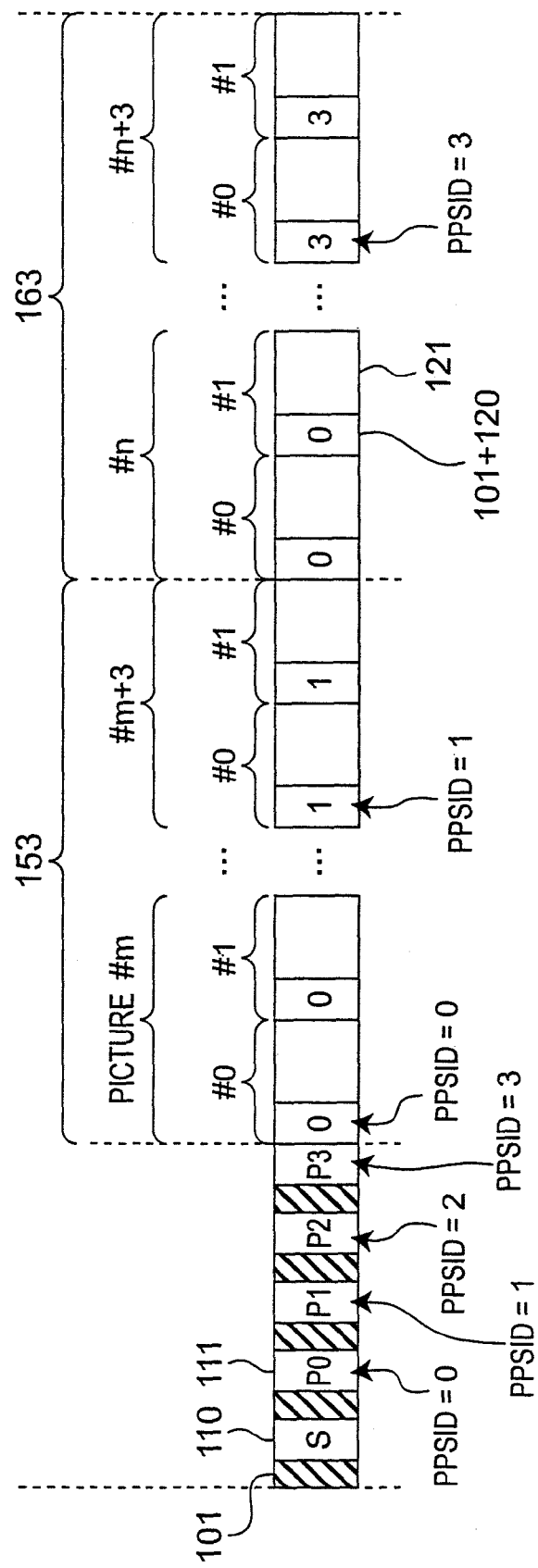
FIG. 8 describes the process of connecting streams in the second embodiment of the invention.

FIG. 8 describes an example of connecting substream a (153) and substream b (163) in FIG. 7 using the video editing device. First, all PPS that are required after the streams are connected are output. Because the PPSID in the slice headers are unique if the video coding device according to this embodiment of the invention is used. Thus the streams can be connected without rewriting the variable length coded PPSID values. Because the processing load of rewriting the PPSID to different length code words increases proportionally to the stream length, the invention is particularly effective because there is no need to rewrite the PPSID parameters.

Figure 9:
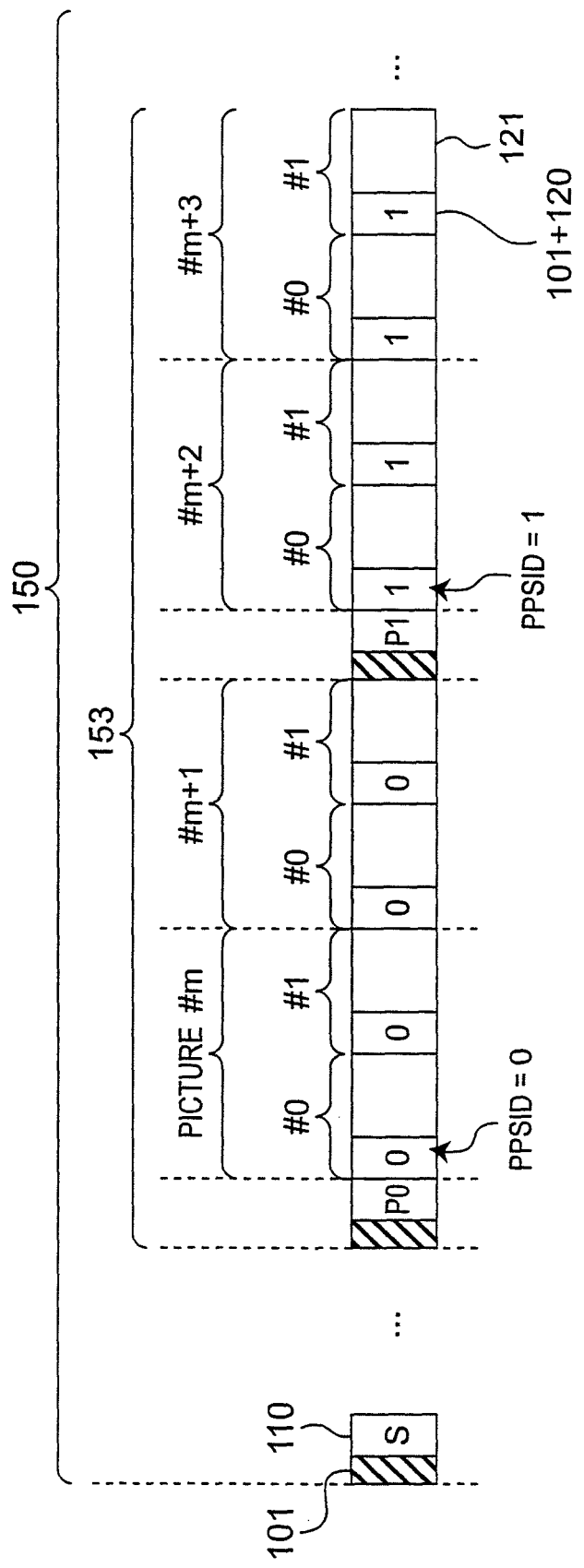
FIG. 9 describes the process of connecting streams in the second embodiment of the invention.

The PPS is output immediately after the SPS in FIG. 7 and FIG. 8, but the PPS can be inserted just before the picture containing the first PPSID as shown in FIG. 9. As described in the fourth embodiment below, a unique PPSID is not always assigned to all streams encoded by the video coding device of this embodiment as shown in FIG. 6. A unique PPSID can be selected only when the parameters such as the horizontal pixel count, vertical pixel count, and bit rate of the pictures are the same, or when the connection is significant.

As described above, this embodiment of the invention affords a video coding device that can reduce the processor load when connecting a plurality of byte streams containing a plurality of encoded picture parameter sets.

Embodiment 3

This embodiment of the invention describes a video editing device that can encode the IDR pictures without duplicating the idr_pic_id of the pictures at the seam and can minimize the area on the recording medium where the values are rewritten when connecting a plurality of byte streams encoded with IDR pictures.

1. Configuration of the Video Editing Device

Figure 10:
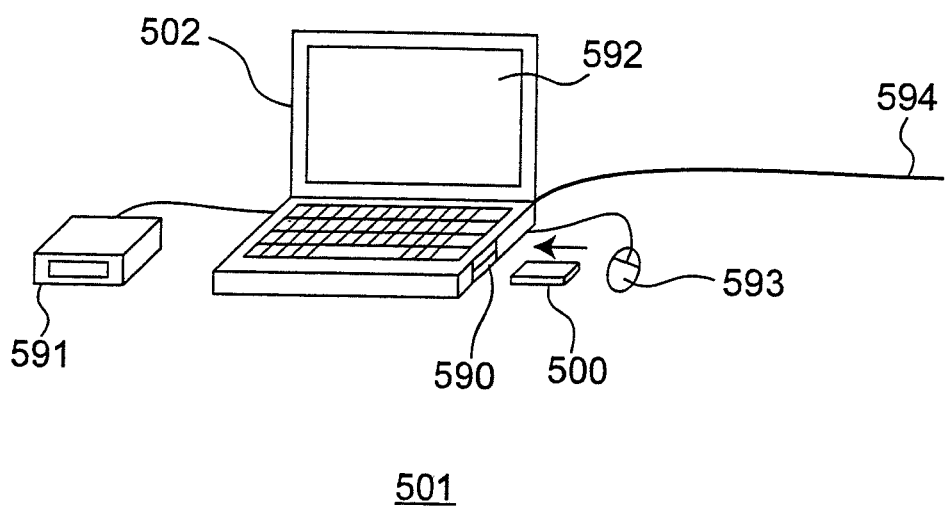
FIG. 10 shows a video editing device according to a third embodiment of the invention.

FIG. 10 shows a video editing device according to this embodiment of the invention. This video editing device 501 is rendered using a computer 502. The computer 502 has an internal drive 590 or an external drive 591 for accessing the recording medium 500 containing video data. The recording medium 500 is a computer-readable medium such as a memory card, an optical disc, or a removable hard disk drive, for example. The computer 502 could be connected by a network cable 594 or wirelessly to a network for sending and receiving video data. A display 592 and input device 593 such as a mouse and keyboard are also connected to the computer 502 for video editing by the user.

Figure 11:
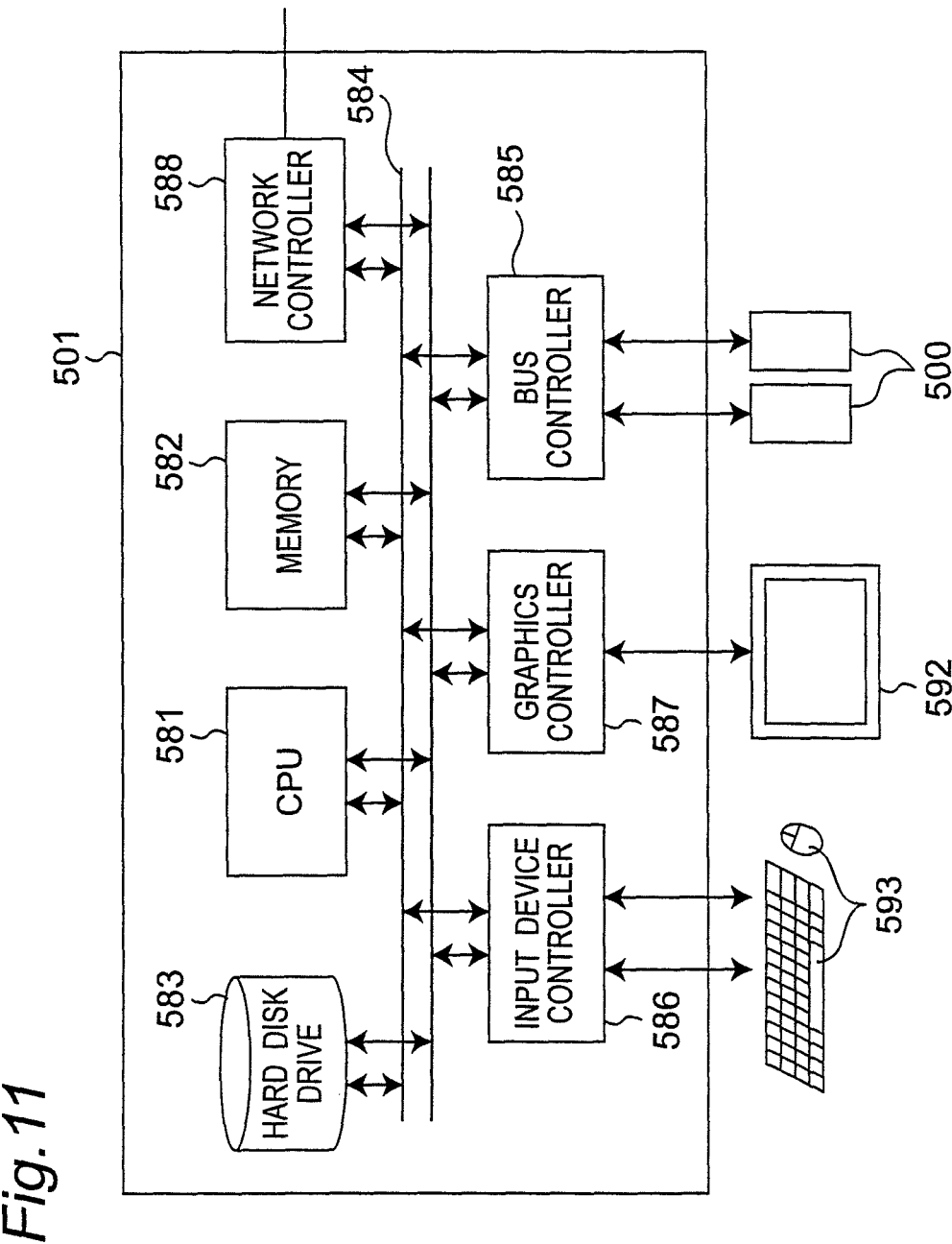
FIG. 11 is a block diagram of the video editing device according to the third embodiment of the invention.

FIG. 11 is a block diagram of the video editing device 501. The video editing device 501 has a CPU 581, a memory 582, a hard disk drive 583 for storing programs and the operating system (OS), and an internal bus 584 connecting these and other devices. The hard disk drive 583 stores programs and the operating system. The video editing device 501 also has a bus controller 585 for connecting the recording medium 500, a network controller 588 for inputting and outputting video data over a network, a graphics controller 587 for connecting the display 592, and an input device controller 586 for connecting the input device 593.

The recording medium 500 could be connected using an ATA (AT Attachment) or USB (Universal Serial Bus) interface, for example. The OS and programs are stored on the hard disk drive 583, and are loaded into the memory 582 and run by the CPU 581 as needed. The video editing function of the video editing device 501 is achieved by an appropriate program running under the OS.

Figure 12:
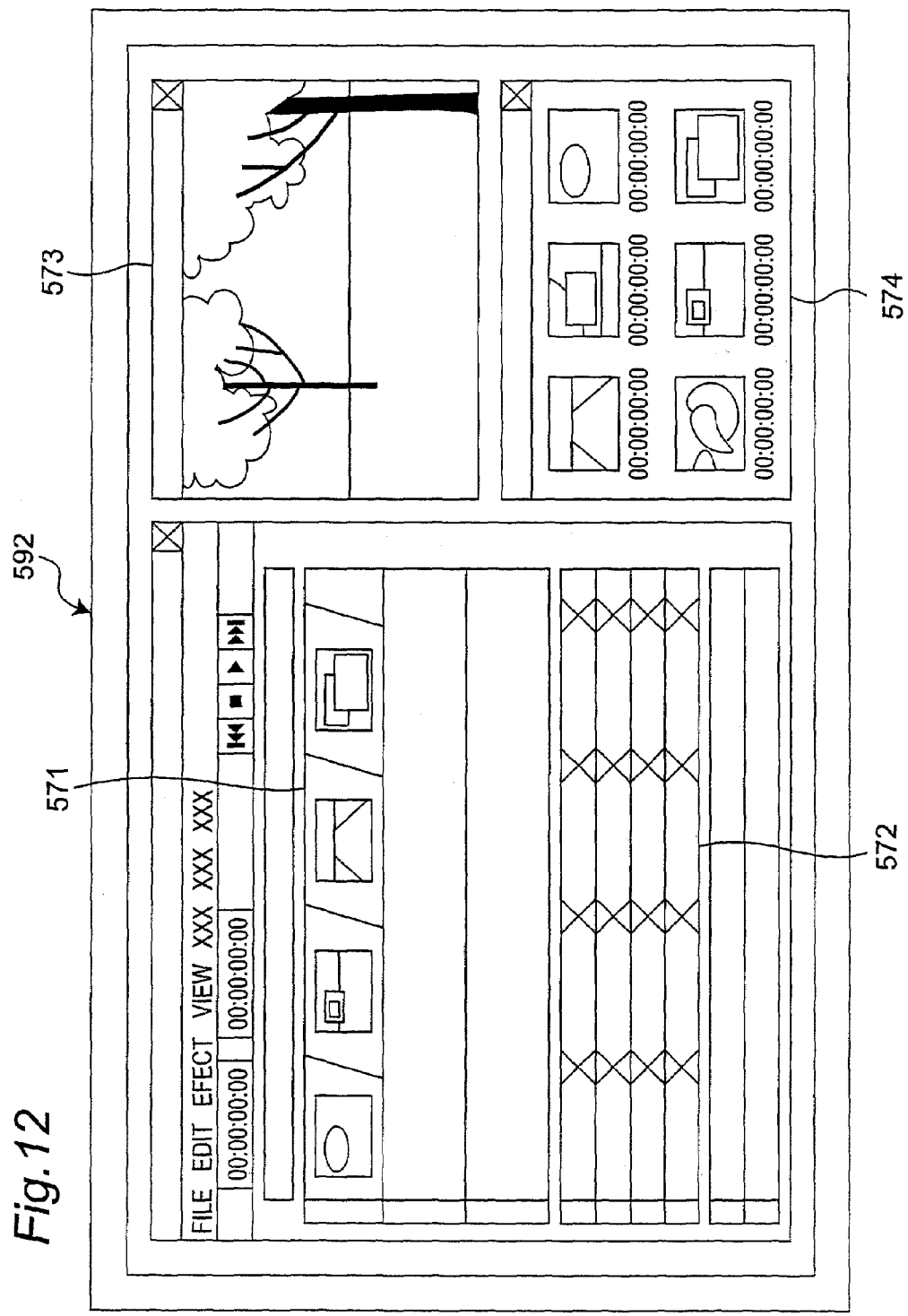
FIG. 12 shows an example of the editing window displayed in the video editing device according to the third embodiment of the invention.

An example of a window screen displayed on the display 592 of the video editing device 501 is shown in FIG. 12. The display 592 displays a time line 571 for video editing, a time line 572 for audio editing, a preview window 573 for displaying reproduced video content, and a bin window 574 for displaying a list of the captured video contents. Byte streams are connected by the user selecting a plurality of video content streams displayed in the bin window 574 using the input device 593 and dragging them into the video time line 571 to output (render) the finished file.

Figure 30:
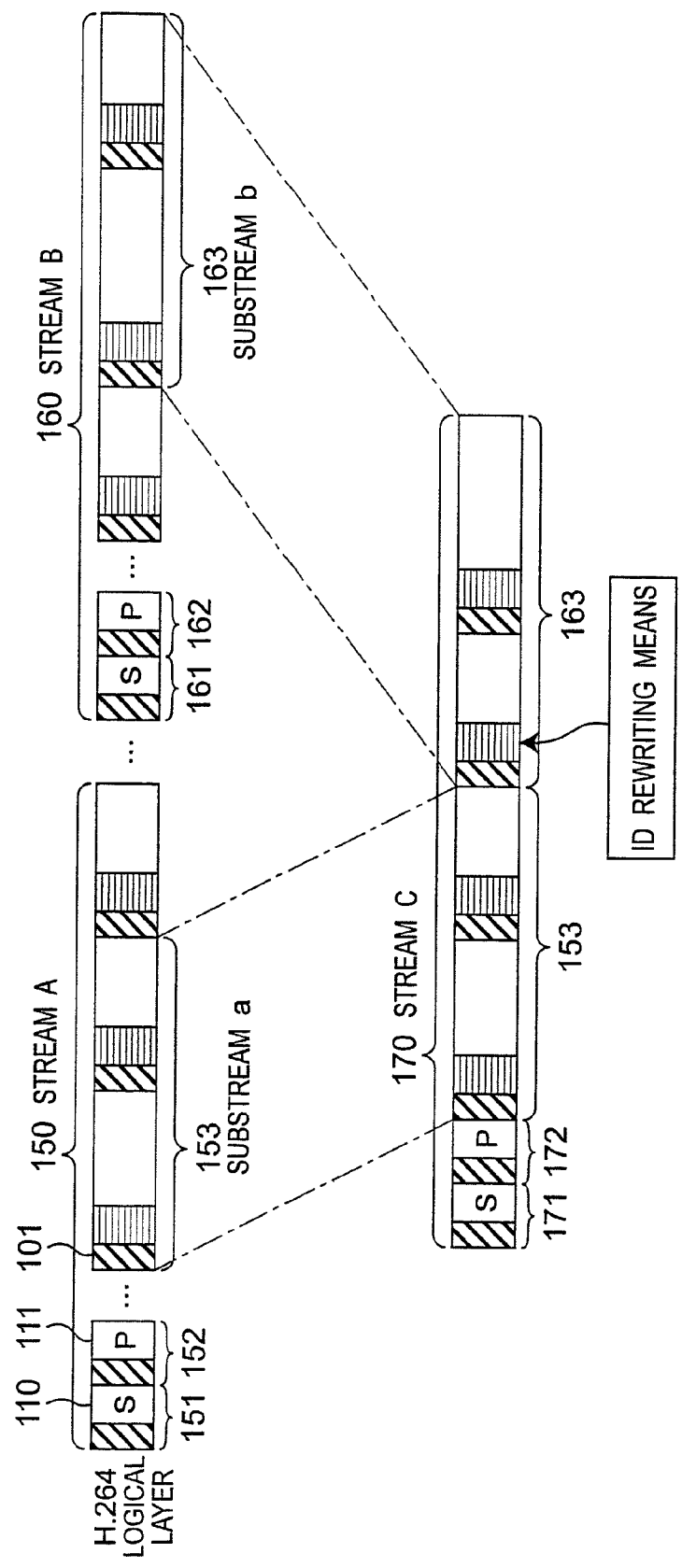
FIG. 30 describes the basic byte stream connection process of the first embodiment of the invention.

The following description of this process assumes that the substream a (153) and substream b (163) shown in FIG. 30 are stored to a recording medium such as the memory 582, the hard disk drive 583, the recording medium 500, or a network drive connected by the network controller 588 shown in FIG. 11. A byte stream C (170) connecting substream a (153) and substream b (163) is generated on such a recording medium. As a result, the byte stream C (170) can ideally be generated by simply rewriting the directory management information on the recording medium so that substream a (153) and substream b (163) are connected.

This embodiment of the invention is directed to an ID rewriting process for rewriting the idr_pic_id. The process for rewriting the idr_pic_id is done as follows. When connecting a plurality of byte streams encoded using IDR pictures, the ID rewriting process changes the picture ID (idr_pic_id) of the pictures adjacent to the seam so that the idr_pic_id values are not the same and can be different by rewriting the smallest area possible on the recording medium.

2. Stream Connection Process

The stream connection process of the video editing device according to this embodiment of the invention is described next with reference to the flow chart in FIG. 13.

First, the process of reading and generating the SPS and PPS is done (S11). In this example the SPS-BNU 151 of stream A (150) and the SPS-BNU 161 of stream B (160) are read to generate the SPS-BNU 171 of byte stream C (153). If the SPS-BNU 171 of byte stream C (153) is the same as the SPS-BNU 151 of stream A (150) or the SPS-BNU 161 of stream B (160), there is no need to create a new SPS-BNU 171 on the recording medium. The PPS-BNU 152 of stream A (150) and the PPS-BNU 162 of stream B (160) are similarly read to generate the PPS-BNU 172 of byte stream C (170).

The ID (id_Alast) of the last picture in substream a (153) is then read (step S12), the ID (id_B1) of the first picture in substream b (163) is read (step S13), and the ID (id_B2) of the second picture in substream b (163) is read (step S14).

The stream ID, that is, idr_pic_id, can be acquired as follows.

First, the stream is searched for start_code_prefix_one_3bytes (FIG. 29) and the value of nal_unit_type contained in the NAL unit (FIG. 26) is determined to find the NAL unit containing the slice layer. The idr_pic_id can be found by interpreting the slice header of the slice layer.

The ID is then rewritten (S15). This process rewrites the idr_pic_id if the idr_pic_id is the same in the adjacent pictures. The directory management information is then updated (step S16). This process connects the SPS, PPS, substream a (153), and substream b (163) into a single stream, and ends.

The directory management information is also updated to add an SPS and PPS to the parts of stream A (150) other than substream a (153) and to the parts of stream B (160) other than substream b (163) to render a byte stream.

The process of reading and generating the SPS and PPS (step S11 in FIG. 13) is described next with reference to the flow chart in FIG. 14.

The SPS 110 of stream A (150) and the SPS of stream B (160) are read (S111, S112). The two SPS are compared to determine if they can be shared (S113). This determination is done as follows.

First, if the two SPS are identical byte trains, it is determined that they can be shared. Second, if only the seq_parameter_set_id of the two SPS is different, it is determined that the SPS can be shared and the seq_parameter_set_id is set to seq_parameter_set_id value of either one of the two SPS. In any other case, it is determined that they cannot be shared. If it is determined that the SPS can be shared, the common SPS is output (S114). If it is determined that they cannot be shared, the SPS of stream A and the SPS of stream B are output (S119, S120).

The PPS of stream A (150) and the PPS of stream B (160) are read (S115, S116). The two PPS are compared to determine if they can be shared (S117). This determination is done as follows.

First, if the two PPS are identical byte trains, it is determined that they can be shared. However, if the seq_parameter_set_id values of the SPS are different in step S113, the PPS will never be identical byte trains. Second, if only the pic_parameter_set_id of the two PPS is different, it is determined that the PPS can be shared and the pic_parameter_set_id is set to the pic_parameter_set_id value of either one of the two PPS. In any other case, it is determined that they cannot be shared. If it is determined that the PPS can be shared, the common PPS is output (S18). If it is determined that they cannot be shared, the PPS of stream A and the PPS of stream B are output (S121, S122).

If the parts of stream A (150) other than substream a (153) and the parts of stream B (160) other than substream b (163) are to be left as a byte stream on the recording medium, a number of SPS and PPS determined by the final number of streams on the recording medium must be output to the recording medium 500.

Figure 15:
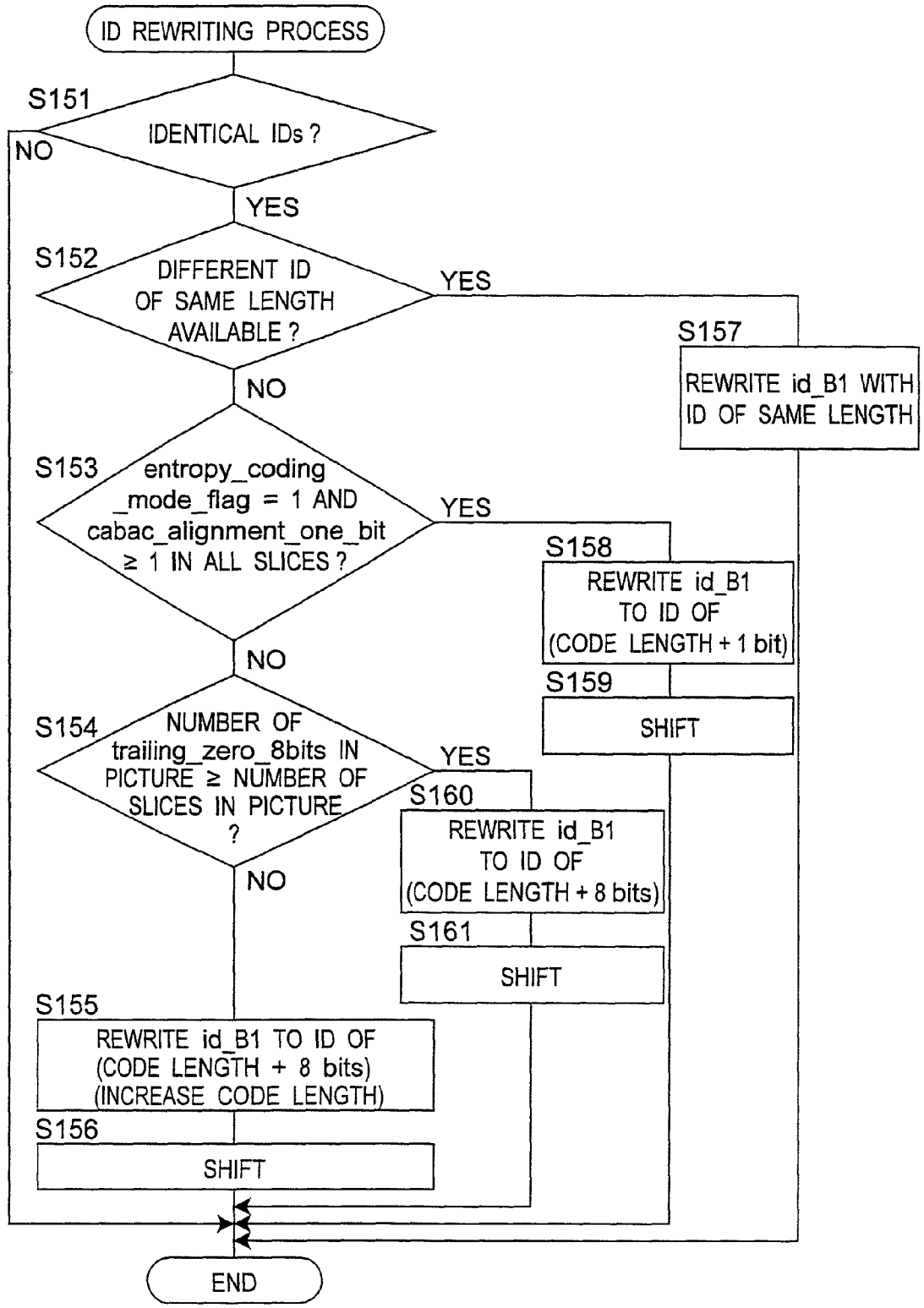
FIG. 15 is a flow chart of the ID rewriting process in the third embodiment of the invention.

The process of rewriting the picture ID (step S15 in FIG. 13) is described next with reference to the flow chart in FIG. 15.

The CPU 581 compares the ID (id_B1) of the first picture in substream b with the ID (id_Alast) of the last picture in substream a, and determines if they overlap (are the same) (S151). If the IDs don't overlap, the ID rewriting process ends. If the IDs overlap, operation continues as described below.

It is determined if there is an ID that has the same code length as id_B1 and is not the same as id_Alast or id_B2 (S152). Using VLC as shown in FIG. 24, for example, if id_Alast=7, id_B1=7, and id_B2=10, there are values 8, 9, 11, 12, 13, 14 as ID (code words) that have the same code length as id_B1 and are different from id_Alast or id_B2. If such an ID is available, id_B1 is rewritten to that ID (S157). If such an ID is not available, such as when id_Alast=1, id_B1=1, and id_B2=2, the length of the slice header can be changed. In this case, a code word contained in a codeNum range different from id_Alast and id_B1 is assigned to id_B1.

Then, it is determined if the entropy_coding_mode_flag is equal to 1 and cabac_alignment_one_bit is equal to or more than 1 in all slices contained in the first picture in substream b (163) (S153). When using context-adaptive binary arithmetic coding (CABAC) (that is, entropy_coding_mode_flag=1), there are cabac_alignment_zero_bit for one or more bits shown in FIG. 28 at the beginning of the slice data if the end of the slice header is not aligned in byte units. If cabac_alignment_one_bit≥1 in all slices contained in the first picture in substream b (163), the cabac_alignment_one_bit for one bit is reduced so that the id_B1 can be replaced with a code word that is only one bit longer than the existing code length without shifting the large slice data.

Figure 16:
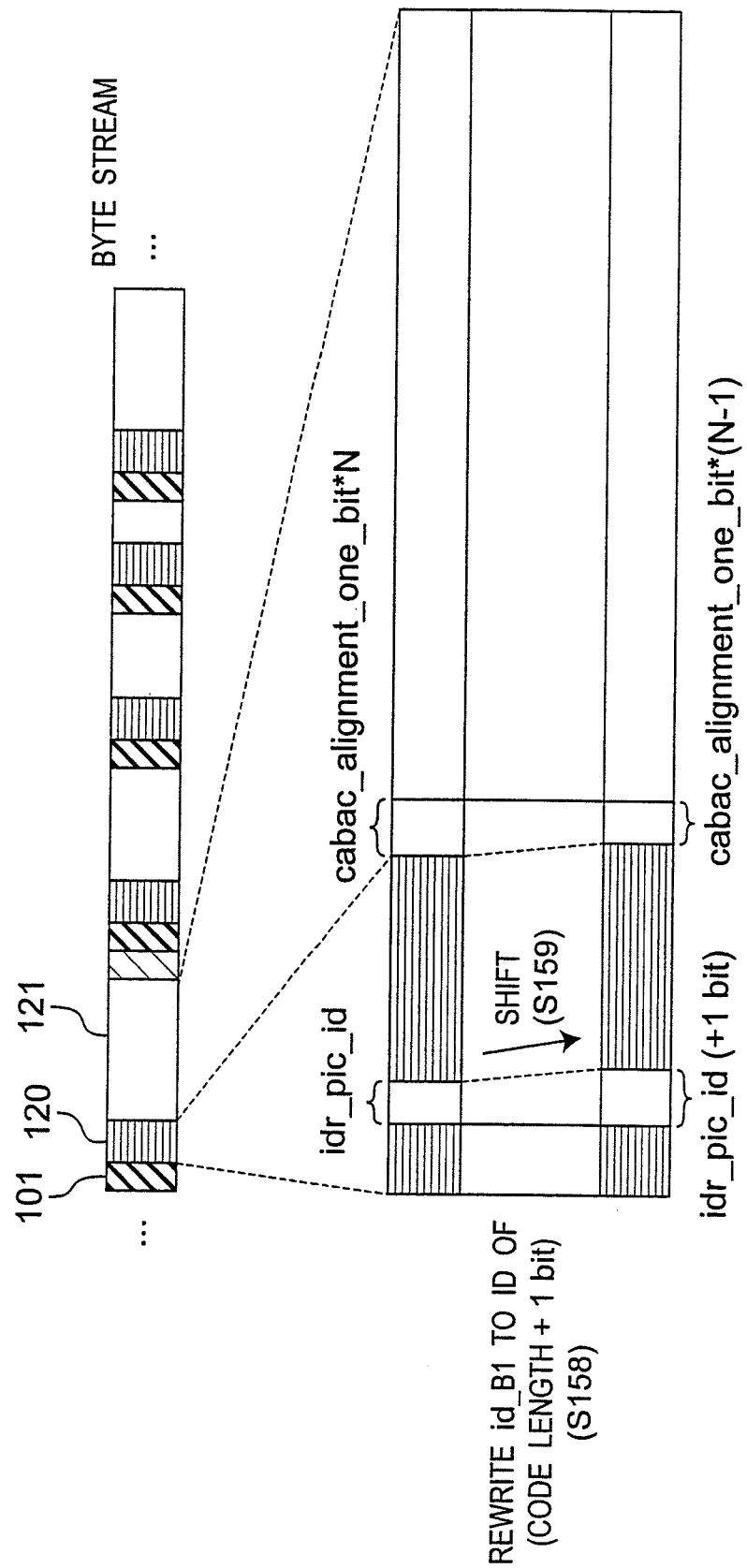
FIG. 16 describes the ID rewriting process in the third embodiment of the invention.

As shown in FIG. 16, id_B1 is rewritten to an ID of the size (code length of the current id_B1+1 bit), and the slice header 120 up to right before the cabac_alignment_one_bit is shifted 1 bit (S159). An ID of the size (code length of the current id_B1+1 bit) will thus never duplicate id_Alast or id_B2. In this case one cabac_alignment_one_bit is deleted. Note that in the step S158 id_B1 could be replaced with a codeword which is N bits (where N is a natural number≤7) longer than the current code word. In this case, N units of cabac_alignment_one_bit in the slice are deleted.

Figure 17:
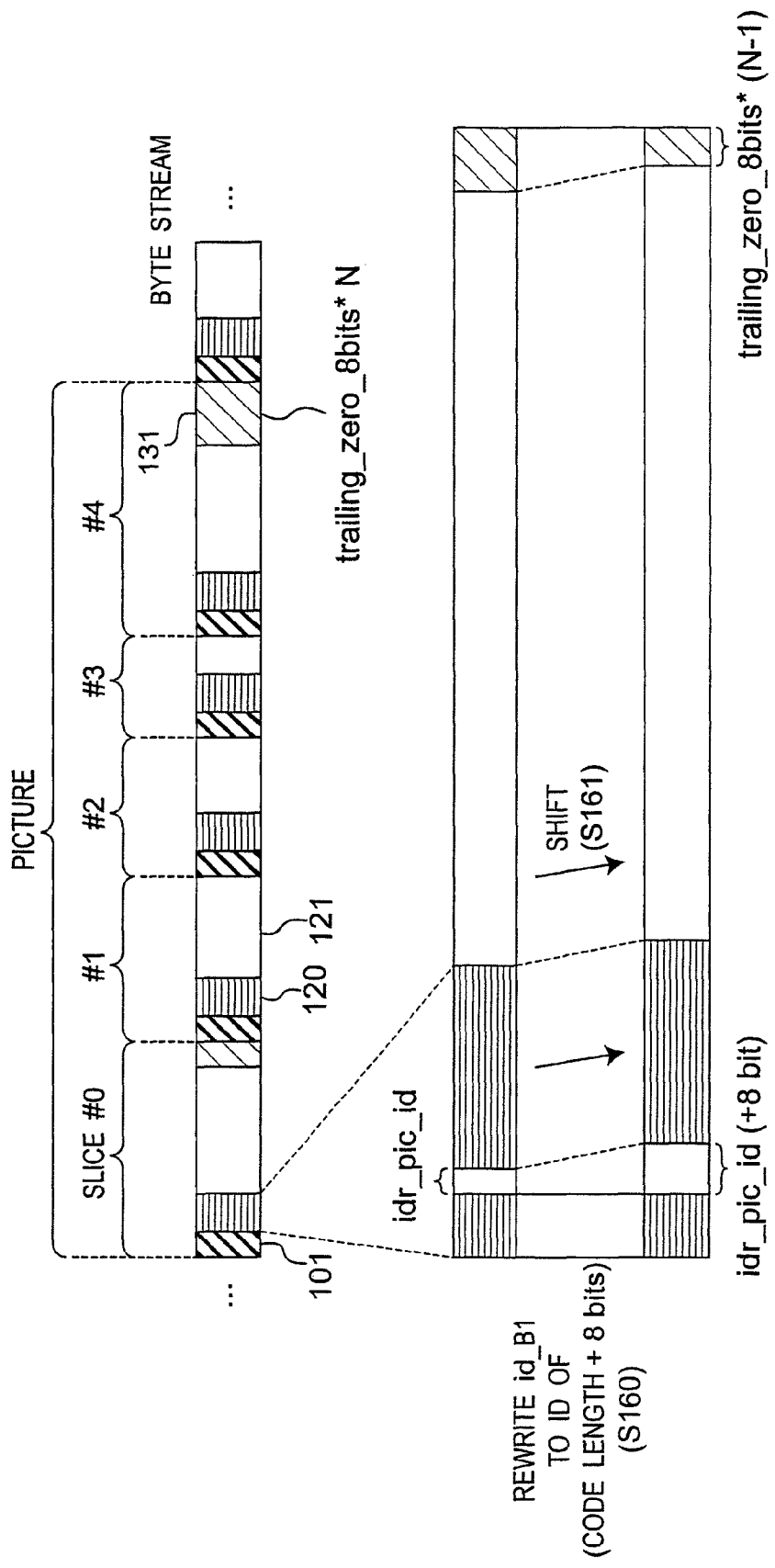
FIG. 17 describes the ID rewriting process in the third embodiment of the invention.

If the step S153 returns No, it is determined if the number of trailing_zero_8 bits in the picture is greater than or equal to the number of slices in the picture (S154). The trailing_zero_8 bits are located after the end of the NAL unit (nal_unit) shown in FIG. 29, and therefore there are 0 or more trailing_zero_8 bits at the end of each slice layer. As shown in FIG. 17, if the number of trailing_zero_8 bits in the first picture in substream b (163) is greater than or equal to the number of slices in the picture, id_B1 is rewritten to an ID of size (code length of current id_B1+8 bits) (S160), and slice layer data before the trailing_zero_8 bits is shifted by 8 bits (=1 byte) (step S161). In the example shown in FIG. 17, the total code length of slice #1 does not change if one trailing_zero_8 bits immediately following slice #1 is reduced.

Even if there are no trailing_zero_8 bits immediately after the slice layer, as in slice #1 to #3, slice #1 can be shifted by one byte, slice #2 shifted by two bytes, slice #3 shifted by three bytes, and slice #4 shifted by four bytes, and four units of trailing_zero_8 bits following slice #4 can be reduced. Because this process does not change the code length of the picture, there is no effect on the downstream pictures.

Referring again to FIG. 15, if the number of trailing_zero_8 bits in the picture is less than the number of slices in the picture, the code length of the picture increases. The step S154 replaces id_B1 with an ID of size (code length of current id_B1+8 bits), but the code length is not limited to this length. Setting the size of the code word to (code length of current id_B1+8 bits) is attributed to simplifying the process because the slice layer data can be simply shifted in byte units. The slice layer data is shifted by the increase in the code length in step S155 (S156). This process continues until the increase in the code length using trailing_zero_8 bits is absorbed or continues up to the end of the substream b (163). The increase in the code words can also be set to an integer multiple of 8 bits (=1 byte).

Figure 13:
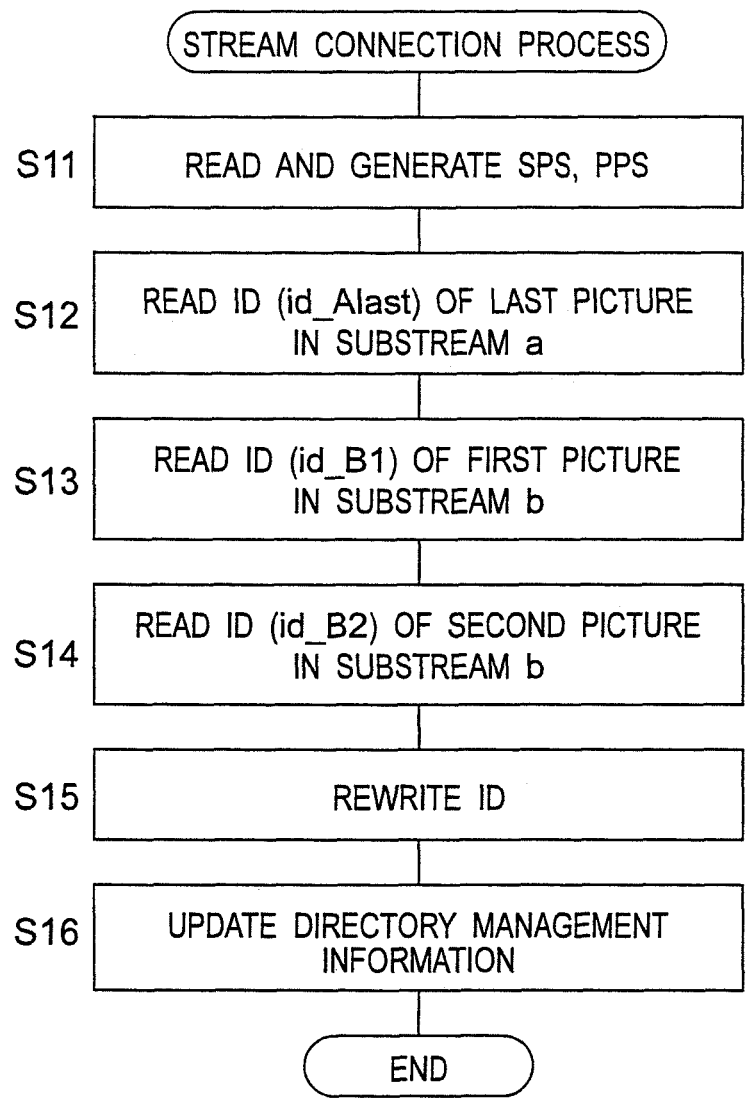
FIG. 13 is a flow chart of the stream connection process in the third embodiment of the invention.
Figure 14:
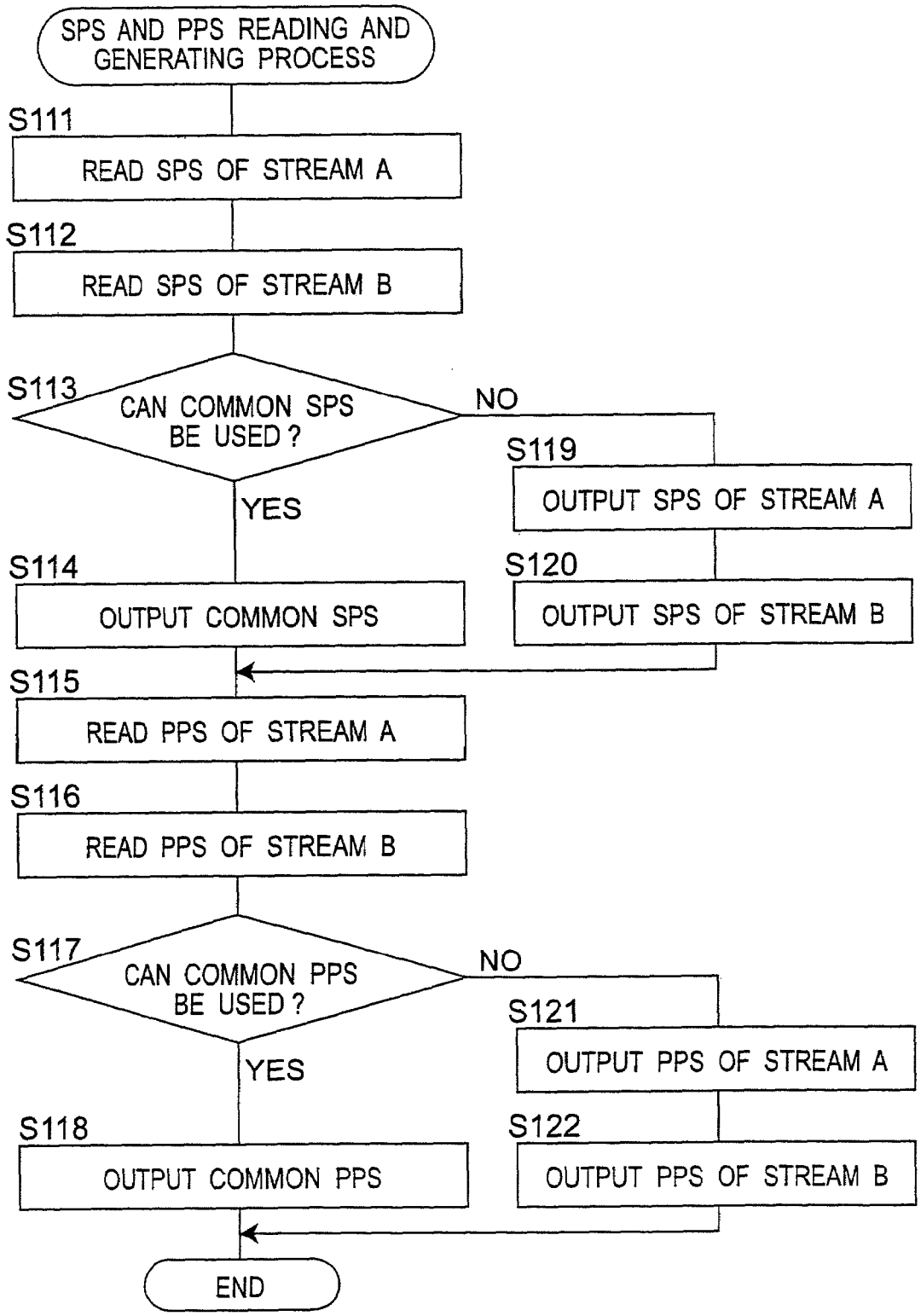
FIG. 14 is a flow chart of the SPS and PPS reading and generating step in the third embodiment of the invention.

Updating the directory management information in step S16 in FIG. 13 is described using cluster management information by way of example.

Cluster management information records information on link between clusters where data for each file is stored on disc, similarly to the file allocation table (FAT) in a FAT file system. The cluster is the access unit used for managing the areas where files (streams) are stored. The recording area of one file (stream) is a set of clusters.

Figure 18:
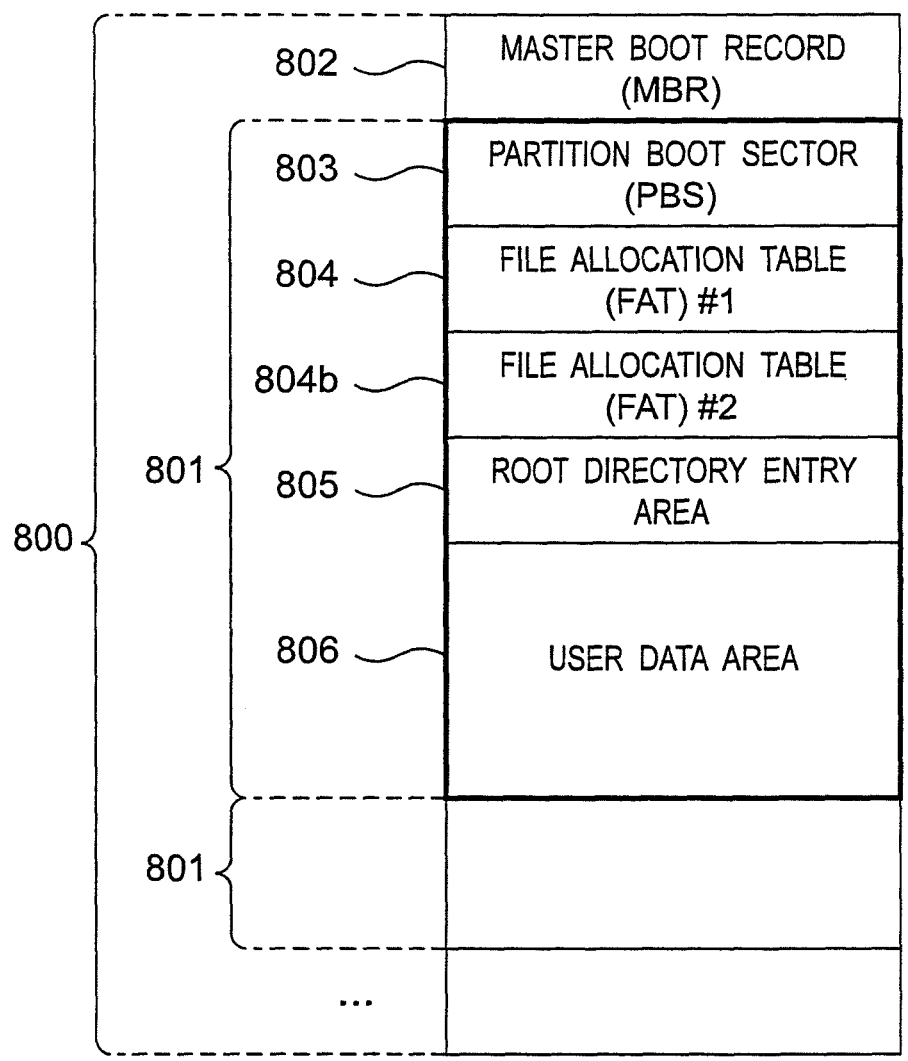
FIG. 18 shows the volume structure of the FAT file system in the third embodiment of the invention.
Figure 19:
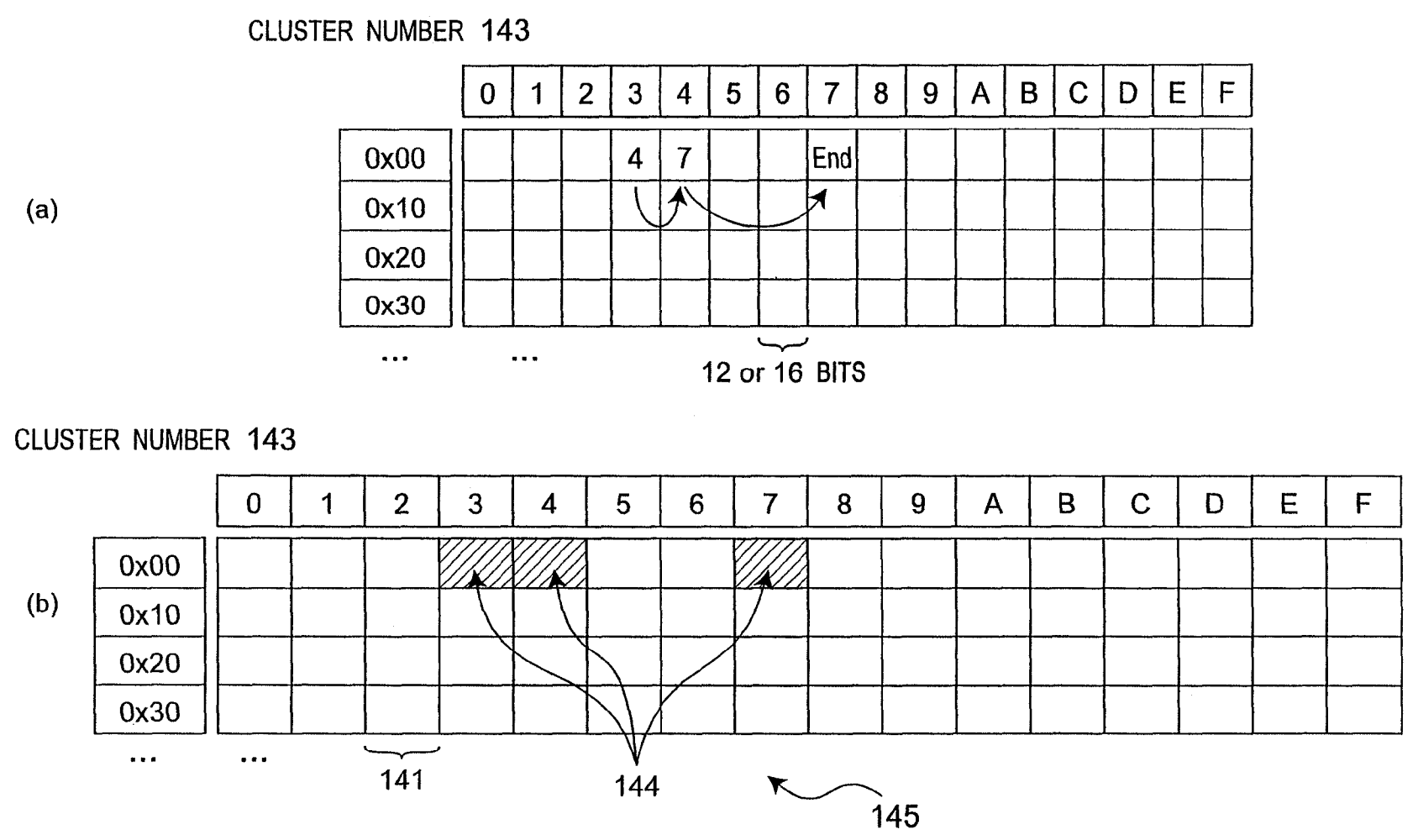

FIG. 18 shows the volume structure of a FAT file system. This figure shows an area structure in which e logical drive 801 set inside the physical drive 800 such as the recording medium 500 is formatted in the FAT file system. The file allocation table 804 is a table of cluster numbers 143 as shown in FIG. 19, and shows the links between the data parts 144 of a cluster unit recorded in the user data area 806. FIG. 19 shows an example of clusters 3, 4, and 7 composing a single file 145.

When the ID (parameter) is rewritten, data is rewritten only for the clusters with that ID. In the directory management information updating process (step S16) in this embodiment of the invention, the links between the clusters corresponding to the recording areas of the SPS, PPS, substream a (153), and substream b (163) are changed in the file allocation table 804 to connect the SPS, PPS, substream a (153), and substream b (163) into a single file.

Figure 20:
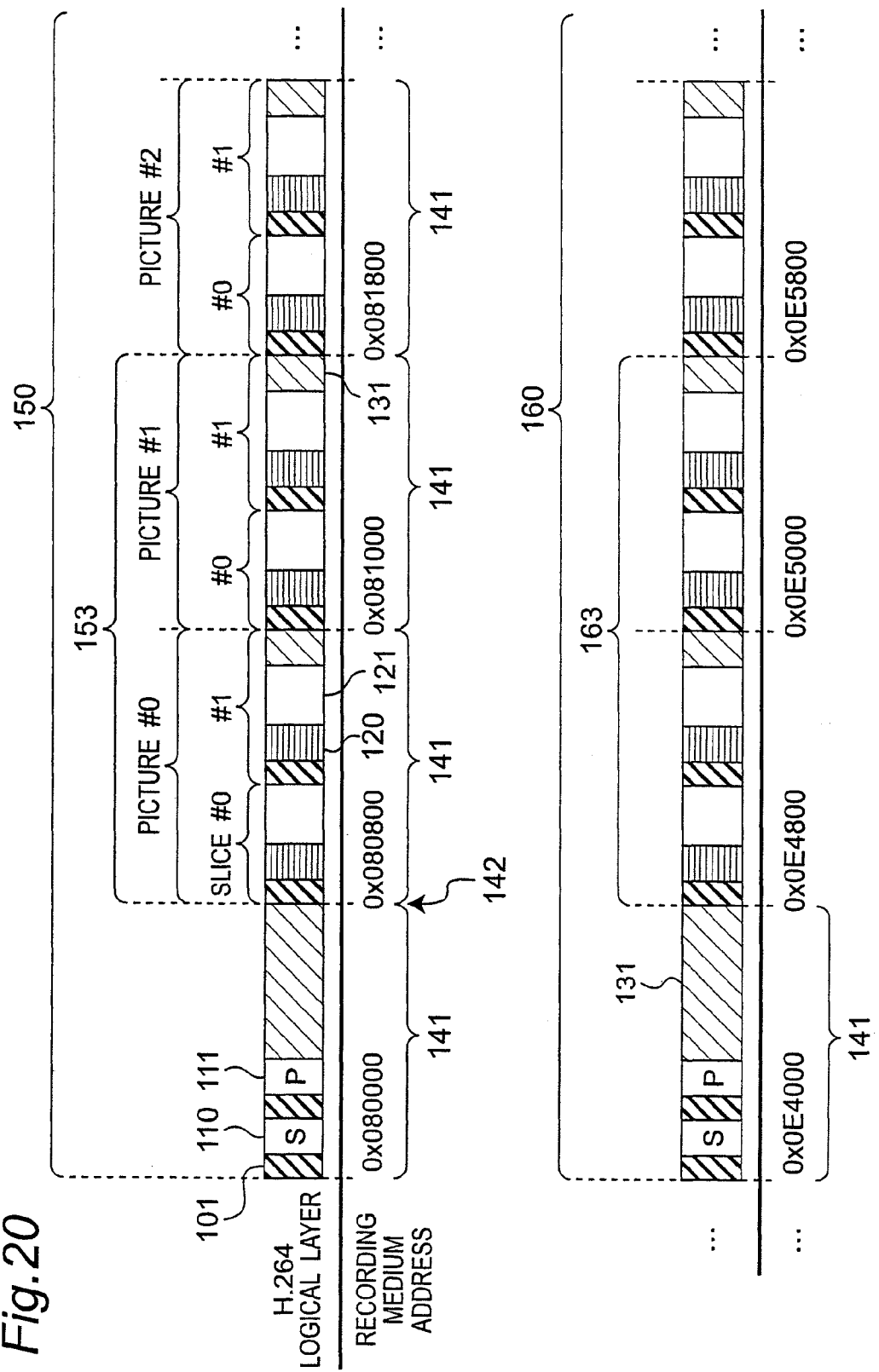
FIG. 20 describes recording streams as files to a recording medium in the third embodiment of the invention.

With reference to FIG. 20, a case in which the video coding device records the streams used in this embodiment as files to a recording medium, such as a hard disk, an optical disc, is described below.

As shown in FIG. 20, stream A (150) and stream B (160) are recorded to the recording medium 500 so that the beginning of the data for each picture is aligned with the beginning of the file system recording unit which is a cluster 141 in this embodiment. This embodiment of the invention is particularly effective when the end of substream a (153) and the beginning of substream b (163) are thus recorded in alignment because the connected streams do not need to be rewritten. If the end of a picture data block is not aligned with a cluster boundary 142 when the video is encoded by the video coding device, stuffing bytes (trailing_zero_8 bits) 131 of invalid data are added. The recorded substream a (153) and substream b (163) are connected in the method described above.

The unit that is aligned with the cluster 141 is not limited to a picture. Slices, GOPs (Group of Pictures) or other unit whereby streams can be connected can be used.

FIG. 20 shows two slices included in one picture, but the invention can obviously be used with any number of slices. This embodiment of the invention is described with the beginning of a picture aligned with the cluster boundary, but the invention can also be used with the beginning of a GOP or other stream editing unit aligned with the cluster boundary. The seam where substream a (153) and substream b (163) are connected can also be aligned with the cluster boundary.

3. Conclusion

As described above when streams (such as H.264 standard byte streams) containing variable length coded parameters (idr_pic_id) are connected and interchangeability can be assured using code words of the same code length as the variable length code word for the parameter, this embodiment rewrites the code word of the parameter in the header of the pictures at the seam, and minimizes the processor load required to rewrite the data if a code word of the same length is not available. This can provide a video editing device that can connect a plurality of byte streams that are encoded using IDR pictures without duplicating the idr_pic_id in adjacent pictures and minimize the area where values are rewritten on the recording medium. The area where values are rewritten can be minimized because of the following reasons.

1) When the id_B1 can be rewritten with a code word of the same length (S157), only the idr_pic_id needs to be rewritten for all slices contained in the picture.

2) When a code word of the same length is not available (S158), cabac_alignment_one_bit can be used so that rewriting the large slice data is not necessary.

3) If rewriting the slice data is necessary (S155), the slice data can be shifted in byte units by shifting id_B1 by 8 bits.

This embodiment of the invention describes the case of rewriting the ID of the first picture in substream b (163), but it will be obvious that the same procedure can be used to rewrite the ID of the last picture in substream a (153) instead.

If using substream a (153) can lighten the load of the ID rewriting process (S15), rewriting the ID of the last picture in substream a (153) is preferable.

This embodiment of the invention is described the case of using trailing_zero_8 bits, but cabac_zero word can be used instead of trailing_zero_8 bits, or invalid data in the system stream containing the NAL unit can be used.

The process of connecting streams according to the H.264 standard is used by way of example above, but the invention can be used with any video editing device that rewrites a variable length coded syntax. A device having a CPU 581 and memory 582 as shown in FIG. 11, and an OS and programs running on the video editing device is considered as the video editing device, however it will be obvious that the means of executing the connection process described above is not limited to this hardware configuration.

Embodiment 4

This embodiment of the invention is the video editing device of the third embodiment modified to correctly rewrite pic_parameter_set_id and minimize the area required to rewrite the values on the recording medium when connecting plural byte streams. The operation of this video editing device is basically the same as the operation of the third embodiment described in the flow charts in FIG. 13 to FIG. 15, differing in that the pic_parameter_set_id parameter is substituted for the idr_pic_id parameter.

An extreme example to which this embodiment of the invention is applied is when the PPS describing the specific picture parameters is different between substream a (153) and substream b (163), and the same pic_parameter_set_id is used. In this case, the step S117 in the SPS/PPS reading and generating process S11 shown in FIG. 14 determines that the PPS cannot be shared, and the step S122 outputs a PPS with the changed pic_parameter_set_id in the PPS of stream B. Because the pic_parameter_set_id of the PPS is changed, the pic_parameter_set_id referenced in the slice header of all pictures in substream b (163) must also be changed. The process for changing the variable length coded pic_parameter_set_id in all slices of substream b (163) might require shifting the entire stream if rewriting to a same-length code word of a different value is not possible. The invention minimizes the shifting process and is therefore extremely useful.

As described above this embodiment of the invention affords a video editing device that can correctly rewrite pic_parameter_set_id and minimize the area required to rewrite the values on the recording medium when connecting plural byte streams.

The invention can be advantageously used in video coding devices such as digital camcorders and recorders, and in video editing devices for editing video streams recorded by digital camcorders and recorders.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom. This application is related to Japanese Patent Application No. 2006-154264, filed on Jun. 2, 2006, the content of which is incorporated herein by reference.

The invention claimed is:

1. A coding device for encoding an input digital signal to generate a stream, comprising:

an encoder operable to encode the input digital signal using code words contained in one of plural code word groups, the plural code word groups including variable length code words; and a multiplexer operable to generate the stream by generating a parameter describing specific information about the stream, encoding the parameter to define an encoded parameter, and adding the encoded parameter to data output from the encoder, wherein a length of the code words contained in any single code word group of the plural code word groups is the same, and when encoding a specific parameter which is required to be rewritten when two streams are connected to generate the stream and which is required to be set to a different value between adjacent pictures in the stream, the multiplexer selects one selected code word group containing at least three code words out of the plural code word groups, and codes the specific parameter using one code word selected from the code words contained in the one selected code word group.

2. The coding device according to claim 1, wherein the stream is a video signal which is encoded according to the H.264 standard, and the specific parameter is a idr_pic_id.

3. The coding device according to claim 2, wherein the encoder generates slice data obtained by encoding the video signal, the multiplexer generates the stream by generating a header for the slice data and adding the header to the slice data, and the specific parameter is contained in the header.

4. A recording device which encodes an input digital signal and records an encoded stream, comprising:

an encoder operable to encode the input digital signal using code words contained in one of plural code word groups, the plural code word groups including variable length code words;

a multiplexer operable to generate the encoded stream by generating a parameter describing specific information about the encoded stream, encoding the parameter to define an encoded parameter, and adding the encoded parameter to data output from the encoder; and a recorder operable to record the encoded stream generated by the multiplexer to a recording medium, wherein a length of the code words contained in any single code word group of the plural code word groups is the same, and when encoding a specific parameter which is required to be rewritten when two streams are connected to generate the encoded stream and which is required to be set to a different value between adjacent pictures in the stream, the multiplexer selects one selected code word group containing at least three code words out of the plural code word groups, and codes the specific parameter using one code word selected from the code words contained in the one selected code word group.

5. The coding device according to claim 1, wherein the length of the code words contained in any single code word group of the plural code word groups differs from the length of the code words contained in any other code word group of the plural code word groups.

6. The coding device according to claim 5, wherein the multiplexer selects the one selected code word group out of the plural code word groups with the length of the code words contained in the one selected code word group being equal to a length of the specific parameter.

7. The coding device according to claim 1, wherein the multiplexer selects the one code word from the code words contained in the one selected code word group for coding the specific parameter in a first of the two streams with the one code word being different than a second specific parameter of a second of the two streams.

8. The coding device according to claim 7, wherein, when the first of the two streams is connected to a third stream, the multiplexer selects the one code word from the code words contained in the one selected code word group for coding the specific parameter in the first of the two streams with the one code word also being different than a third specific parameter of the third stream.

9. The recording device according to claim 4, wherein the length of the code words contained in any single code word group of the plural code word groups differs from the length of the code words contained in any other code word group of the plural code word groups.

10. The recording device according to claim 9, wherein the multiplexer selects the one selected code word group out of the plural code word groups with the length of the code words contained in the one selected code word group being equal to a length of the specific parameter.

* * * * *